US009250852B2

(12) United States Patent
Horiuchi et al.

(10) Patent No.: US 9,250,852 B2
(45) Date of Patent: Feb. 2, 2016

(54) SCREEN OUTPUT SYSTEM THAT PREVENTS THE DISPLAY OF SELECTED INFORMATION

(71) Applicant: International Business Machines Corporation, Armonk, NY (US)

(72) Inventors: Yoshio Horiuchi, Kanagawa-ken (JP); Takaaki Kawase, Tokyo (JP); Daisuke Maruyama, Kanagawa (JP); Satoko Kinoshita, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 269 days.

(21) Appl. No.: 13/723,243

(22) Filed: Dec. 21, 2012

(65) Prior Publication Data
US 2014/0176394 A1    Jun. 26, 2014

(30) Foreign Application Priority Data
Dec. 22, 2011    (JP) .................................. 2011-281623

(51) Int. Cl.
*G06F 3/14*    (2006.01)
*G09G 5/14*    (2006.01)

(52) U.S. Cl.
CPC ............ *G06F 3/1415* (2013.01); *G06F 3/1462* (2013.01); *G09G 5/14* (2013.01); *G09G 2320/103* (2013.01); *G09G 2340/12* (2013.01); *G09G 2358/00* (2013.01)

(58) Field of Classification Search
CPC ....................................................... G06F 3/14
See application file for complete search history.

(56) References Cited

U.S. PATENT DOCUMENTS

| | | | | | |
|---|---|---|---|---|---|
| 5,107,443 | A | * | 4/1992 | Smith et al. ................... | 715/751 |
| 6,308,199 | B1 | * | 10/2001 | Katsurabayashi ............ | 709/204 |
| 6,463,460 | B1 | * | 10/2002 | Simonoff ...................... | 709/203 |
| 6,601,087 | B1 | * | 7/2003 | Zhu et al. ...................... | 709/205 |
| 7,275,212 | B2 | * | 9/2007 | Leichtling .................... | 715/733 |
| 7,672,997 | B2 | * | 3/2010 | Chavis et al. ................ | 709/205 |
| 8,117,560 | B1 | * | 2/2012 | Lu et al. ........................ | 715/789 |
| 8,473,850 | B2 | * | 6/2013 | Liang et al. ................... | 715/751 |
| 8,589,800 | B2 | * | 11/2013 | Kominac et al. ............. | 715/740 |
| 8,599,214 | B1 | * | 12/2013 | Dall et al. ..................... | 345/601 |
| 8,782,247 | B2 | * | 7/2014 | Sinclair et al. ............... | 709/227 |

(Continued)

FOREIGN PATENT DOCUMENTS

| | | |
|---|---|---|
| JP | 2001197479 A | 7/2001 |
| JP | 2004258242 A | 9/2004 |

(Continued)

*Primary Examiner* — Stephen R Koziol
*Assistant Examiner* — Robert Craddock
(74) *Attorney, Agent, or Firm* — Cantor Colburn LLP

(57) ABSTRACT

An information processing apparatus, a screen output system, a screen output control method, and a program control output are disclosed. The information processing apparatus includes an image acquiring unit, a differential region extracting unit, a designation accepting unit, and an image output unit. The image acquiring unit acquires a first image to be output to a first display. The differential region extracting unit extracts a differential region that differs between the first image and a second image to be output to a second display. The designation accepting unit accepts a designation of whether to output each differential region to the second display. The image output unit incorporates a portion of the first image that corresponds to a differential region for which a designation to output has been accepted into the second image and outputs the updated second image to the second display.

20 Claims, 15 Drawing Sheets

(56) References Cited

U.S. PATENT DOCUMENTS

| | | | |
|---|---|---|---|
| 2003/0085922 A1* | 5/2003 | Wei | 345/751 |
| 2004/0179036 A1* | 9/2004 | Teplov et al. | 345/751 |
| 2006/0031779 A1* | 2/2006 | Theurer et al. | 715/781 |
| 2006/0136828 A1* | 6/2006 | Asano | 715/733 |
| 2006/0265665 A1* | 11/2006 | Yoshida | 715/781 |
| 2007/0028244 A1* | 2/2007 | Landis et al. | 718/108 |
| 2007/0188482 A1* | 8/2007 | Fujimori | 345/204 |
| 2007/0257927 A1* | 11/2007 | Sakanishi et al. | 345/581 |
| 2008/0002911 A1* | 1/2008 | Eisen et al. | 382/283 |
| 2008/0126480 A1* | 5/2008 | Hintermeister et al. | 709/204 |
| 2008/0155437 A1* | 6/2008 | Morris | 715/765 |
| 2008/0285892 A1* | 11/2008 | Sposato et al. | 382/311 |
| 2010/0165236 A1 | 7/2010 | Bae et al. | |
| 2011/0004888 A1* | 1/2011 | Srinivasan et al. | 719/329 |
| 2011/0197263 A1* | 8/2011 | Stinson, III | 726/4 |
| 2012/0005759 A1* | 1/2012 | Kawakita | 726/26 |
| 2013/0136125 A1* | 5/2013 | Jain et al. | 370/392 |

FOREIGN PATENT DOCUMENTS

| | | |
|---|---|---|
| JP | 2005345543 A | 12/2005 |
| JP | 2007218944 A | 8/2007 |
| JP | 2008046567 A | 2/2008 |
| JP | 2008102332 A | 5/2008 |
| JP | 2009063727 A | 3/2009 |
| JP | 2009098281 A | 5/2009 |
| JP | 2009175396 A | 8/2009 |
| JP | 2009175397 A | 8/2009 |
| JP | 2009294558 A | 12/2009 |
| JP | 2010145925 A | 7/2010 |
| JP | 2010237936 A | 10/2010 |
| JP | 2010244561 A | 10/2010 |

* cited by examiner

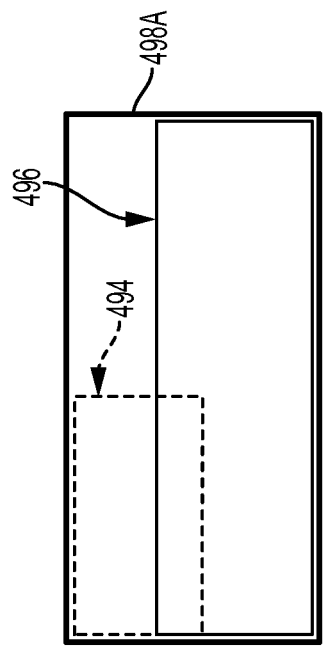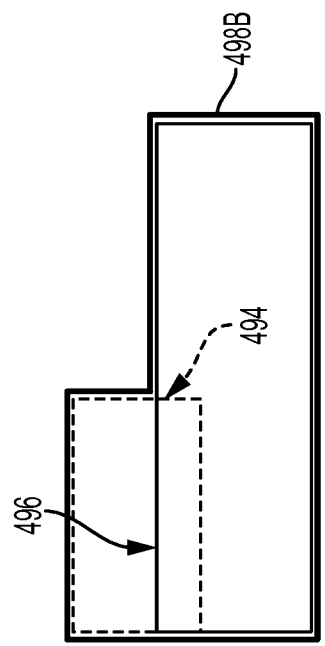

SCREEN OUTPUT SYSTEM THAT PREVENTS THE DISPLAY OF SELECTED INFORMATION

PRIORITY

This application claims priority to Japanese Patent Application No. 2011-281623, filed Dec. 22, 2011, and all the benefits accruing therefrom under 35 U.S.C. §119, the contents of which in its entirety are herein incorporated by reference.

BACKGROUND

The present disclosure relates to screen output control, and in particular, to an information processing apparatus, a screen output system, a screen output control method, and a program for controlling screen outputs to a video output device with consideration for the release of information.

As projectors become smaller and less expensive, projectors are more and more often used for projecting materials on a screen at meetings and demonstrations of applications.

In these circumstances, information that should not be displayed to the public can be accidentally displayed with a projector, revealing the information. For example, when an application under development is demonstrated at a meeting using a browser in the presence of outside personnel such as a customer, private information such as a candidate uniform resource locator (URL), bookmarks, a browser histories, or a chat screen or a mail message containing internal confidential information can accidentally be projected.

Such information that should not be displayed to the public can be revealed due to an error in operation, or by forgetting to deactivate a display setting. It is relatively difficult to check every setting that can reveal private information and change settings before starting projection. There is also a possibility of receiving such information after starting projection. Therefore, there is a demand for development of a technique for efficiently preventing accidental revelation of such information.

SUMMARY

In one embodiment, an information processing apparatus, a screen output system, a screen output control method, and a program control output are disclosed. The information processing apparatus includes an image acquiring unit, a differential region extracting unit, a designation accepting unit, and an image output unit. The image acquiring unit acquires a first image to be output to a first display. The differential region extracting unit extracts a differential region that differs between the first image and a second image to be output to a second display. The designation accepting unit accepts a designation of whether to output each differential region to the second display. The image output unit incorporates a portion of the first image that corresponds to a differential region for which a designation to output has been accepted into the second image and outputs the updated second image to the second display.

In another embodiment, a screen output system is provided having a first information processing apparatus including a plurality of display outputs and a second information processing apparatus. The first information processing apparatus includes an image acquiring unit configured to acquire a first image for output to a first display. The first information processing apparatus includes a differential region extracting unit configured to extract a differential region between the first image and a second image for output to a second display. The first information processing apparatus includes a designation accepting unit configured to accept a designation of whether a differential region is output to the second display from one or both of the first information processing apparatus and the second information processing apparatus over one of a network and an input device of the first information processing apparatus, for each differential region. The first information processing apparatus includes an image output unit configured to incorporate a portion of the first image that corresponds to the differential region for which a designation of output has been accepted into the second image, and to output the updated second image to the second display.

In yet another embodiment, a screen output control method for implementation by an information processing apparatus having a plurality of display outputs is provided. The method includes acquiring, by the information processing apparatus, a first image for output to a first display. The method includes extracting, by the information processing apparatus, a differential region between the first image and a second image for output to a second display. The method includes accepting, by the information processing apparatus, a designation of whether a differential region is output to the second display for each differential region. The method includes incorporating, by the information processing apparatus, a portion of the first image that corresponds to the differential region for which a designation of output has been accepted into the second image in response to a synchronization event and outputting the updated second image to the second display.

In another embodiment, a computer program product for realizing an information processing apparatus having a plurality of display outputs is provided. The program causes a computer to function as an image acquiring unit configured to acquire a first image for output to a first display. The program causes a computer to function as a differential region extracting unit configured to extract a differential region between the first image and a second image for output to a second display. The program causes a computer to function as a designation accepting unit configured to accept a designation of whether a differential region is output to the second display for each differential region. The program causes a computer to function as an image output unit configured to incorporate a portion of the first image that corresponds to the differential region for which a designation of output has been accepted into the second image and to output the updated second image to the second display.

BRIEF DESCRIPTION OF DRAWINGS

FIG. 14 depicts diagrams illustrating (A) a differential region represented as a rectangular region, (B) a differential region represented as a polygon or a curvilinear region, (C) a differential region after merge represented as a minimum rectangular region encompassing a plurality of differential regions, and (D) a differential region after merge represented as a minimum polygon or a curvilinear region encompassing a plurality of differential regions according to an embodiment.

DESCRIPTION OF EMBODIMENT

Figure 1:
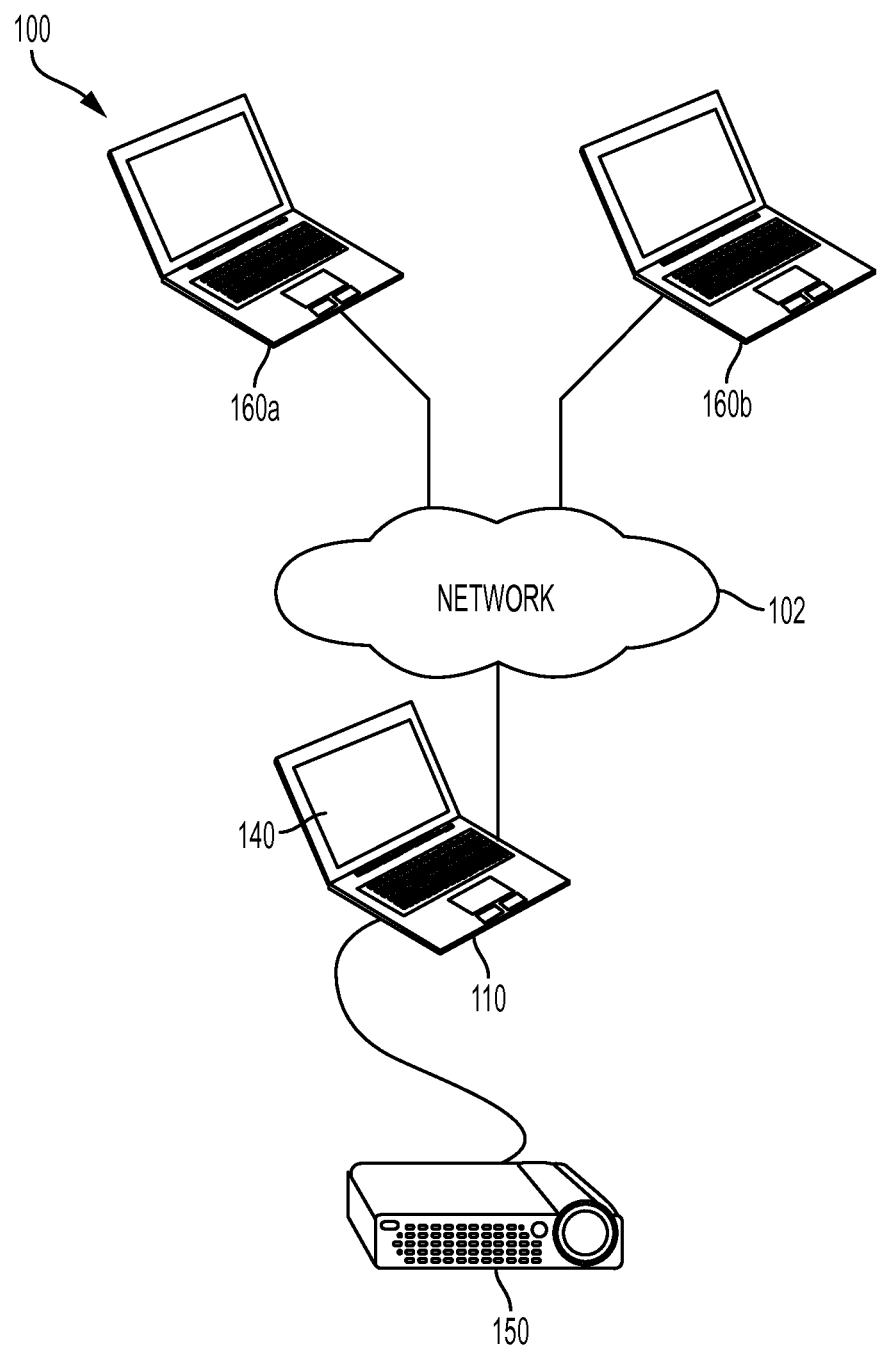
FIG. 1 is a schematic configuration diagram of a video projection system according to an embodiment.

While an embodiment of the present disclosure will be described below, the present disclosure is not limited to the embodiment described. In the following embodiment, a screen output system including an information processing apparatus having a plurality of display outputs will be described by taking as an example a video projection system having a main display built-in and including a computer connected to an external video output device as a sub-display.

A known technique to address revelation of such information is described in JP2008-46567A, which is referred to as Patent Literature 1. Patent Literature 1 discloses a technique intended to prevent personal information displayed on a display device from being displayed on an external display device such as a projector when information displayed on the display device is displayed on the external device at the same time. More specifically, Patent Literature 1 discloses a configuration including a window monitoring table in which text relating to personal information that defines a screen to be kept from being displayed on an external display device is registered, a monitoring unit monitoring whether the text registered in the window monitoring table is included in data in a window memory, and a control unit. When the registered text is detected in the data, the control unit turns off a switch that connects a screen output to a display device to an external interface in response to an output indicating the detection.

Other known techniques to prevent revealing such information are described in JP2008-102332A (Patent Literature 2), JP2009-175396A and JP2009-175397A (Patent Literature 3 and Patent Literature 4). Patent Literature 2 discloses a projector that provides a masked display in which a portion of an ordinary display region is masked in accordance with a predefined mask pattern. Patent Literature 3 and Patent Literature 4 disclose an image display system that applies masking based on masking information to image information started to be output and allows the same image as that is displayed on a liquid-crystal display to be displayed on an image display device with a mask region being masked.

JP2005-345543A (Patent Literature 5) discloses a configuration that when detecting connection to an external display device, enters a mode in which screen information displayed on a display device can also be displayed on an external display device through interface means, and then changes the display content of screen information displayed on the display device and screen information to be displayed on the external display device in accordance with an instruction to hide. Another known technology to hide a portion of a screen display on an external video display device such as a projector is one described in JP2010-145925A (Patent Literature 6). Patent Literature 6 discloses a configuration including display correcting means that hides a portion of an image projected on a whiteboard in order to prevent the projected image from overlapping a picture or text written on the whiteboard to obscure both the projected image and the picture or text.

JP2007-218944A (Patent Literature 7) discloses a configuration that detects a display item, such as an active window, an image display region in a window, a graphic user interface (GUI) component, and an icon, on a display screen of a data processing apparatus, makes a selection as to whether to display or not the detected display item on an image display device, and displays an image on the image display device on the basis of image data of the display item selected to be displayed.

Various techniques are known for masking a part of, or the entire screen during projection from a video output device as mentioned above. However, it may be difficult to ensure hiding of information that should not be revealed, which does not always appear at a fixed position and is difficult to identify with a technique in which a screen to be hidden, such as "a password entry screen," is specified in advance as described in Patent Literature 1, a technique that predefines a portion to be masked as described in Patent Literatures 2 to 4, or a technique that changes the contents of screen information that should be displayed on an external display device in response to a non-display designation after switching as described in Patent Literature 5.

The present disclosure provides an information processing apparatus having the following features. The information processing apparatus has a plurality of display outputs and includes an image acquiring unit acquiring a first image to be output to a first display, a differential region extracting unit extracting differential regions that differs between the first image and a second image to be output to a second display, and a designation accepting unit accepting a designation of whether each of the differential regions is to be output to the second display. The information processing apparatus further includes an image output unit incorporating a portion of the first image that corresponds to a differential region for which a designation of output is accepted into the second image and outputting the updated second image to the second display.

With the configuration described above, changed portions of the first image to be output to the first display and of the second image to be output to the second display are detected and the second image to be output to the second display is updated according to a designation of whether the changed portion is to be output. A portion of the first image that corresponds to the differential region for which a designation of output has been accepted is incorporated into the updated second image. Since the portion of the first image is incorporated into the second image after the designation of output has been accepted, information that should not be revealed can be prevented from being output. Furthermore, since an updated portion is detected as a differential region, the configuration is advantageously applicable to a situation where it is difficult to identify beforehand a portion to be masked.

An information processing apparatus, a screen output system, a screen output method, and a program are disclosed that detect a changed portion of a screen, and output the screen according to designation of whether to reveal or hide the changed portion to thereby enable screen output with consideration given for the release of information.

FIG. 1 is a diagram schematically illustrating a configuration of a video projection system according to an embodiment. The video projection system 100 illustrated in FIG. 1 includes a computer 110. The computer illustrated in FIG. 1 has a main display 140 built-in, is connected to an external video output device 150 through an external vide output interface such as a VGA (Video Graphics Array), DVI (Digital Visual Interface), or HDMI (High-Definition Multimedia Interface), and includes a plurality of display outputs.

While the computer 110 illustrated in FIG. 1 is a laptop personal computer including a display, the computer 110 is not limited to a laptop personal computer. The computer 110 may be implemented as a general-purpose computer such as a tower, micro-tower, desktop, mobile, or tablet personal computer, or a server or a workstation. Alternatively, the computer 110 may be implemented as a portable information terminal such as a mobile phone, a smartphone, a tablet terminal or a PDA (Personal Digital Assistant). Each of the main display 140 and the video output device 150 may be, but are not limited to, a liquid-crystal display, an organic EL (Electro-luminescence) display, a plasma display, a video projector such as a liquid-crystal projector, DLP (Digital Light Processing), LCOS (Liquid Crystal On Silicon), a rear projection display, or a CRT (Cathode Ray Tube) monitor.

The computer 110 according to this embodiment includes screen output control software for outputting a screen being output to the main display 140 of the computer 110 (hereinafter referred to as the local screen) to the video output device 150 (the software will be described later in detail).

When the local screen is projected from the video output device 150, information on the local screen that should not be displayed to the public can be revealed through the video output device 150. FIGS. 2 and 3 illustrate scenarios where information that should not be displayed to the public is displayed on the local display. FIGS. 2 and 3 illustrate snapshots 200, 220, 240, 260 and 280 of a browser screen for accessing a site that can be specified with a given URL through the use of a browser.

Figure 2A:
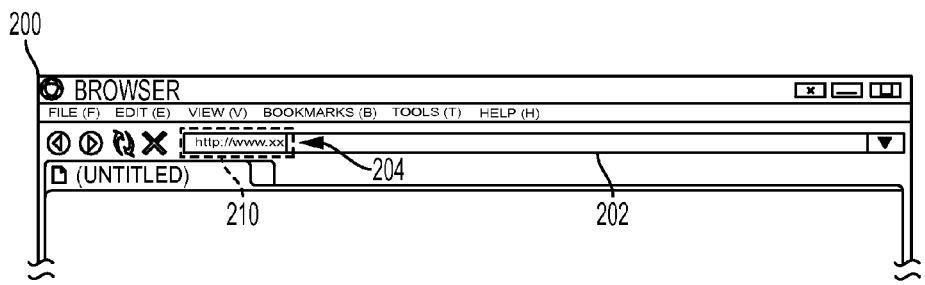
FIG. 2 is a diagram (1/2) illustrating snapshots of a browser screen according to an embodiment.
Figure 2B:
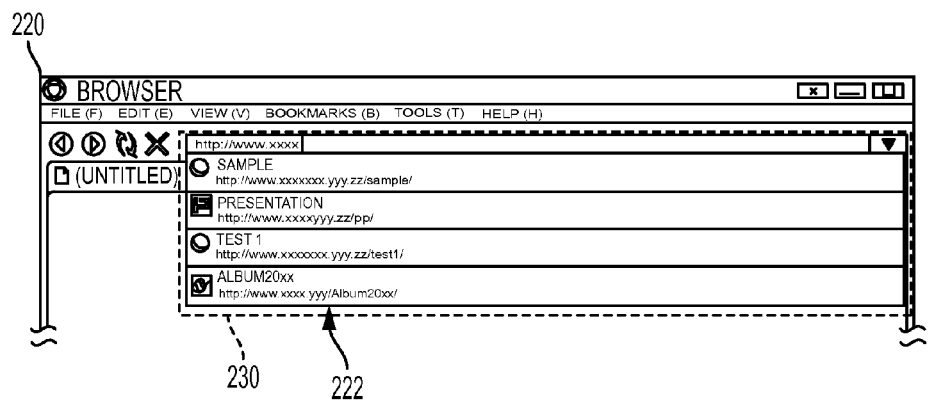

When a character string 204 is input in the address bar 202 of the browser as illustrated in the snapshot 200 in FIG. 2(A), an input assist function can display a dropdown menu 222 that lists candidate sites that match the input character string 204 on the basis of history information or bookmark information as illustrated in the snapshot 220 in FIG. 2(B). When a candidate item 242 corresponding to an intended site is selected from the dropdown menu 222 as illustrated in the snapshot 240 in FIG. 2(C), a transitional read screen illustrated in FIG. 3(A) appears on the browser before the top page 284 of the intended site illustrated in FIG. 3(B) is displayed on the browser.

Figure 2C:
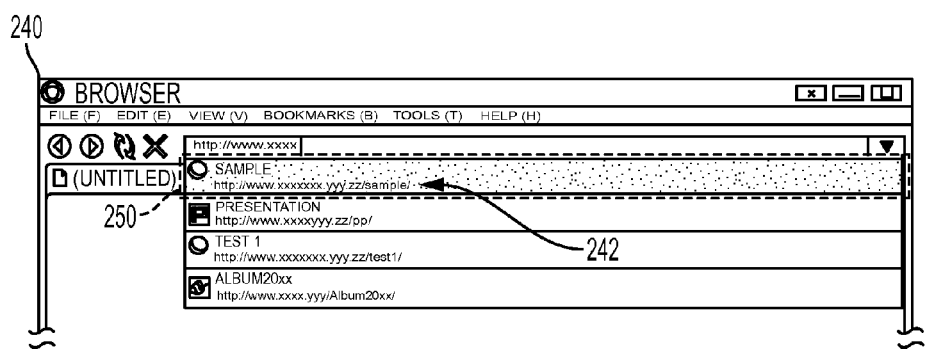
Figure 3A:
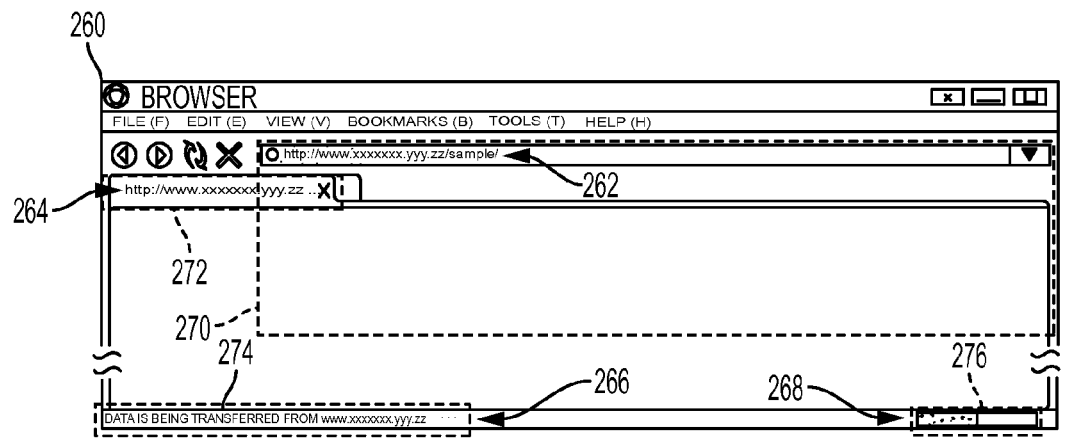
FIG. 3 is a diagram (2/2) illustrating snapshots of a browser screen according to an embodiment.
Figure 3B:
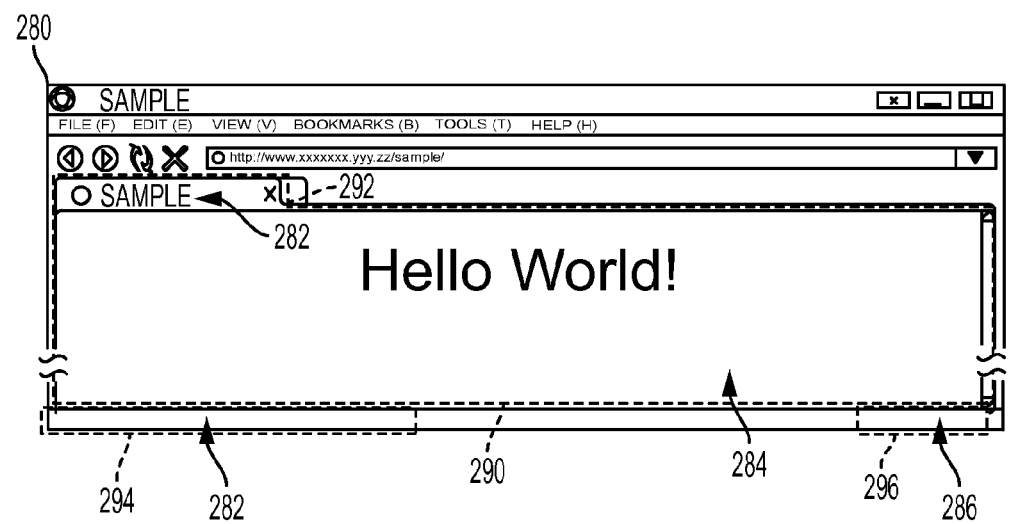

In this scenario, details of the character input in the address bar (the character string 204 being input in FIG. 2(A)), listing of the candidate sites (the dropdown menu 222 in FIG. 2(B)), details of the site determination (the highlight of the candidate item 242 in FIG. 2(C)), changes in the address bar, tabs, status bar in the read screen (the tab display 264, the URL display 266 and the progress display 268 in FIG. 3(A)) do not necessarily need to be projected from the video output device 150. Especially the items in the dropdown menu 222 displayed by the input assist function can include private information and therefore it is actually preferable if those items are not projected. On the other hand, the ultimately displayed screen illustrated in the snapshot 280 in FIG. 3(B) is desired to be projected in this scenario because the screen includes the top page 284 of the intended site.

Therefore, the screen output control program of this embodiment includes the functions of detecting updated portions (including regions 210, 230, 250, 270, 272, 274, 276, 290, 292, 294 and 296 illustrated in FIGS. 2 and 3) in the transitions of the local screen, prompting an operator to issue a designation for each of the portions of the local screen, masking or otherwise hiding portions that are not permitted to be displayed to the public by the operator, and outputting a public screen in which portions permitted to be displayed to the public are reflected to the video output device 150. Here, if all of the portions are permitted to be displayed to the public, the public screen output from the video output device 150 will be the same as the local screen whereas if at least a portion is not permitted to be displayed to the public, the public screen will be different from the local screen.

Referring back to FIG. 1, the computer 110 can be connected to external computers (hereinafter referred to as remote terminals) 160a, 160b through a network 102. The network 102 may include, but is not limited to, a wired or wireless network such as the Internet and a LAN (Local Area Network). The computer 110 of this embodiment is configured to be able to accept a designation of a portion to be permitted to be displayed to the public from the operator of the computer 110 as well as from remote terminals 160 (hereinafter the remote terminals 160a, 160b are collectively referred to as the remote terminal 160) through the network 102.

While the embodiment will be described by taking a configuration including a built-in display and an external display (the external video output device) as an example, a configuration including a plurality of built-in displays or a plurality of external displays may be used in an alternative embodiment. While the connection between the computer 110 and the video output device 150 is made through the external video output interface in the embodiment described, the connection may be made through a wired USB (Universal Serial Bus) connection, a wireless USB connection, a wired LAN (Local Area Network) connection, or a wireless LAN connection.

Figure 4:
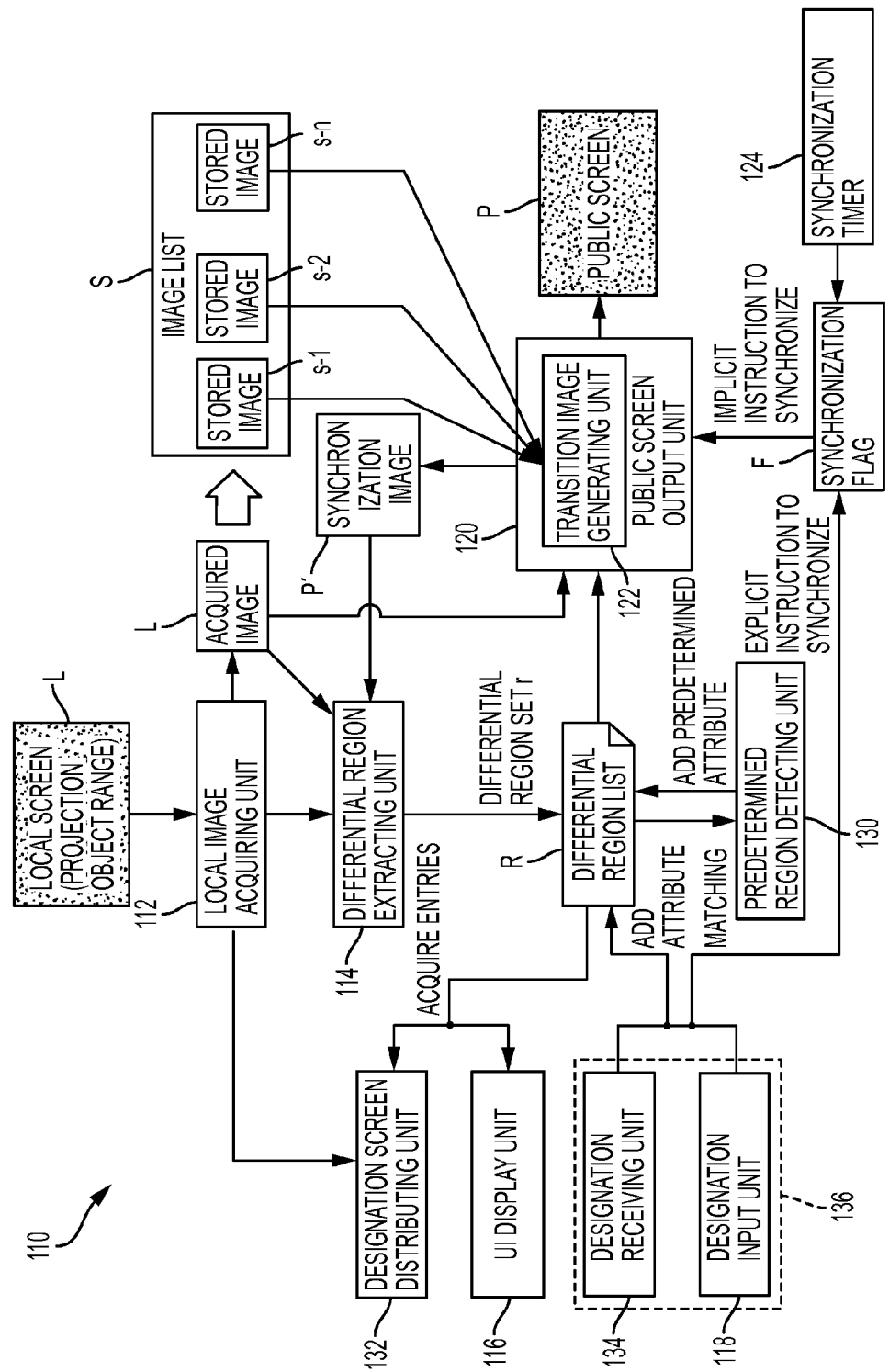
FIG. 4 is a functional block diagram of screen output control software implemented on a computer according to an embodiment.

The screen output control software running on the computer according to this embodiment will be described below in detail with reference to FIGS. 4 to 10. FIG. 4 is a diagram illustrating functional blocks of the screen output control software implemented on the computer according to this embodiment. The functional blocks on the computer 110 illustrated in FIG. 4 include a local image acquiring unit 112 acquiring an image of a local screen, a differential region extracting unit 114, a user interface (UI) display unit 116, a designation input unit 118, and a public screen output unit 120 outputting a public screen into which portions of the local screen that are permitted to be displayed to the public are incorporated to the video output device 150.

The local image acquiring unit 112 captures a local screen image output to the main display 140, for example, at predetermined intervals and stores the captured image in a main memory such as a RAM (Random Access Memory) as an acquired image L. All or part of the local image is set as a projection object and an image in a projection object range of the local screen is projected from the video output device 150 onto a screen. The local image acquiring unit 112 has the function of acquiring an image of a projection object range of the local screen and constitutes an image acquiring unit of this embodiment. Hereinafter, an image of a projection object range of a local screen is referred to as a local image L and an image of a public screen output to the video output device 150 corresponding to the local image L is referred to as a public image P.

The acquired local image (acquired image) L is stored in an image list S as appropriate. Images on the image list S (hereinafter referred to as stored images) s-1 to s-n are stored for providing digest displays, which will be described later in detail, and are kept stored in a period until a synchronization process for reflecting status of the local image in the public screen is performed. The image list S is stored in a main memory such as a RAM or an auxiliary storage device such as an SSD (Solid State Drive) or an HDD (Hard Disk Drive).

The differential region extracting unit 114 compares an acquired image L acquired by the local image acquiring unit 112 with the latest image P' output to the video output device 150 (an image updated by a synchronization process and compared with an acquired image L in difference extraction will be referred to as a synchronization image), for example, at predetermined intervals and extracts a differential region, which is a portion changed between the images.

The differential region can be represented by, but is not limited to, coordinate information of two points of a minimum rectangular region that encompasses a pixel region of an updated portion, from the viewpoint of faster processing. FIG. 14(A) illustrates a differential region 492A represented as a rectangular region when a balloon display object is detected as a pixel region 490 of an updated portion. The differential region can also be represented by coordinate information and parameters of a plurality of points of a minimum graphic region (a region enclosed with line segments and/or curves) 492B that encompasses a pixel region 490 of an updated portion as illustrated in FIG. 14(B). The region may also have an exact shape corresponding to the pixel region of the updated portion. A set r whose elements are newly extracted differential regions (differential region set) is registered on a differential region list R. The differential region list R is stored similarly in an appropriate storage device.

When the differential region extracting unit 114 finds a plurality of differential regions overlapping one another on the differential region list R, the differential region extracting unit 114 merges the differential regions into one differential region element. In an embodiment, the merged differential region is a minimum rectangular region encompassing the plurality of differential regions to be merged. FIG. 14 (C) illustrates a merged differential region 498A represented as a minimum rectangular region encompassing a plurality of differential regions 494, 496. As illustrated in FIG. 14 (D), the merged differential region can be represented by coordinate information and parameters of a plurality of points of a minimum graphic region 498B encompassing a plurality of differential regions 494, 496 or may be in a shape exactly conforming to the plurality of differential regions 494, 496 to be merged.

Differential regions that differs between an acquired image L and a synchronization image P' compared can be extracted by using a technique to extract differences between adjacent frames in moving picture codec or a technique to extract differences between images used for detecting changes with a surveillance camera. Techniques that can be used for extracting differential regions include techniques disclosed in JP2010-237936A, JP2001-197479A, JP2010-244561A, and JP2009-98281A. Thumbnail images of an acquired image L and synchronization image P' may be provided and the thumbnail images may be compared with each other, thereby allowing faster processing than comparison between the full-sized images.

The UI display unit 116 acquires entries of differential regions from the differential region list R and displays on the main display 140 of the computer 110 GUI (Graphical User Interface) components to prompt an operator to input a designation of whether the operator permits the display of that differential region to the public (output) or not (not output) for each of the differential regions. An embodiment of the UI display unit 116 provides on the main display 140 a designation accepting screen including visual cues (VC) which visually represent differential regions and the GUI components provided on the local image in association with each of the differential regions. While the visual cues and GUI components are also displayed on the local screen, the visual cues and GUI components are omitted from the local image L acquired by the local image acquiring unit 112.

The designation input unit 118 accepts a designation of whether to permit a differential region to be displayed to the public or not through an input operation through an input device such as a mouse, a keyboard or a touchpad attached to the computer 110. The designation input unit 118 adds a public attribute value to each differential region designated as being permitted to be displayed to the public and adds a hide attribute value to each differential region designated as not being permitted to be displayed to the public. Accordingly, the entries on the differential region list R holds the attribute values added to the differential regions along with the coordinate information defining the differential regions.

The designation input unit 118 can also accept through an input operation through the input device an explicit instruction from the operator requesting execution of a synchronization process for allowing the status of portions of the local screen that are permitted to be displayed to the public to be reflected on the public screen. The explicit instruction may be an input operation on a GUI component on the designation accepting screen using a mouse or a touchpad as well as a short cut key to which an explicit command to synchronize is assigned. When an explicit instruction to execute the synchronization process is issued, a synchronization flag F is set.

The functional blocks of the screen output control software may further include a synchronization timer 124 that defines the timing of periodic execution of the synchronization process. After the expiration of a preset time interval, the synchronization timer 124 sets a synchronization flag F as an implicit instruction to execute the synchronization process.

In response to occurrence of an input operation event that explicitly instruct to execute the synchronization or in response to the synchronization flag F being set upon the expiration of an interval preset in the synchronization timer 124, the public screen output unit 120 executes the synchronization process. In the synchronization process, the public screen output unit 120 overwrites the latest public image P' with a portion of the local image L that corresponds to differential region to which the public attribute value has been added and outputs the updated public image P to the video output device 150. The updated image P or the local image L at the time of synchronization is stored as a synchronization image P' for the next comparison in the differential region extracting unit 114.

The public screen output unit 120 may further include a transition image generating unit 122 for providing the digest displays described above. As has been described, the local image acquiring unit 112 acquires local images L at a plurality of time points and stores them on the image list S. The transition image generating unit 122 acquires images of portions corresponding to differential regions to which the public attribute value is added from the images s-1 to s-n stored on the image list S at different time points to generate transmission images as described above. The public screen output unit 120 combines the transition images into public images P' in chronological order and outputs updated images to the video output device 150 in sequence. The sequentially output images summarize changes in the local screen in the period between the output of a public image in the previous synchronization process and the output of a public image in which the up-to-date state is reflected in the present synchronization process and are output as frame-by-frame still images or a moving image.

As has been described, a public attribute value or a hide attribute value is added to each differential region in accordance with a designation by the operator. In addition to being based on such an explicit instruction from the operator, the screen output control software may include a predetermined region detecting unit 130 that detects a predetermined differential region defined beforehand as a fixed region to add an attribute value without requesting an operator's designation. A pattern for identifying the predetermined differential region is defined in the predetermined region detecting unit 130. If a differential region on the differential region list R matches the defined pattern, the predetermined region detecting unit 130 detects the differential region as a predetermined differential region and adds a predetermined attribute value (the public attribute value or the hide attribute value) associated with the matching defined pattern.

The function blocks of the screen output control software may further include a designation screen distributing unit 132 and a designation receiving unit 134. The designation screen distributing unit 132 distributes the designation accepting screen described above to remote terminals 160 that have established a remote connection beforehand. The designation receiving unit 134 receives a designation of whether or not to permit public display from a remote terminal 160 through the designation accepting screen.

Accepting a designation of a portion of the local screen to be permitted to be displayed to the public is accepted from a remote terminal 160 as well in this way enables the members of a team attending a presentation or the like to make selection between displaying to the public or hiding changed portions of the local screen and instruct to synchronize as collaborative work. Thus, careful control of public/hide can be performed without fail under the eye of a number of people. The designation input unit 118 and/or the designation receiving unit 134 constitutes a designation accepting unit in this embodiment.

Figure 5:
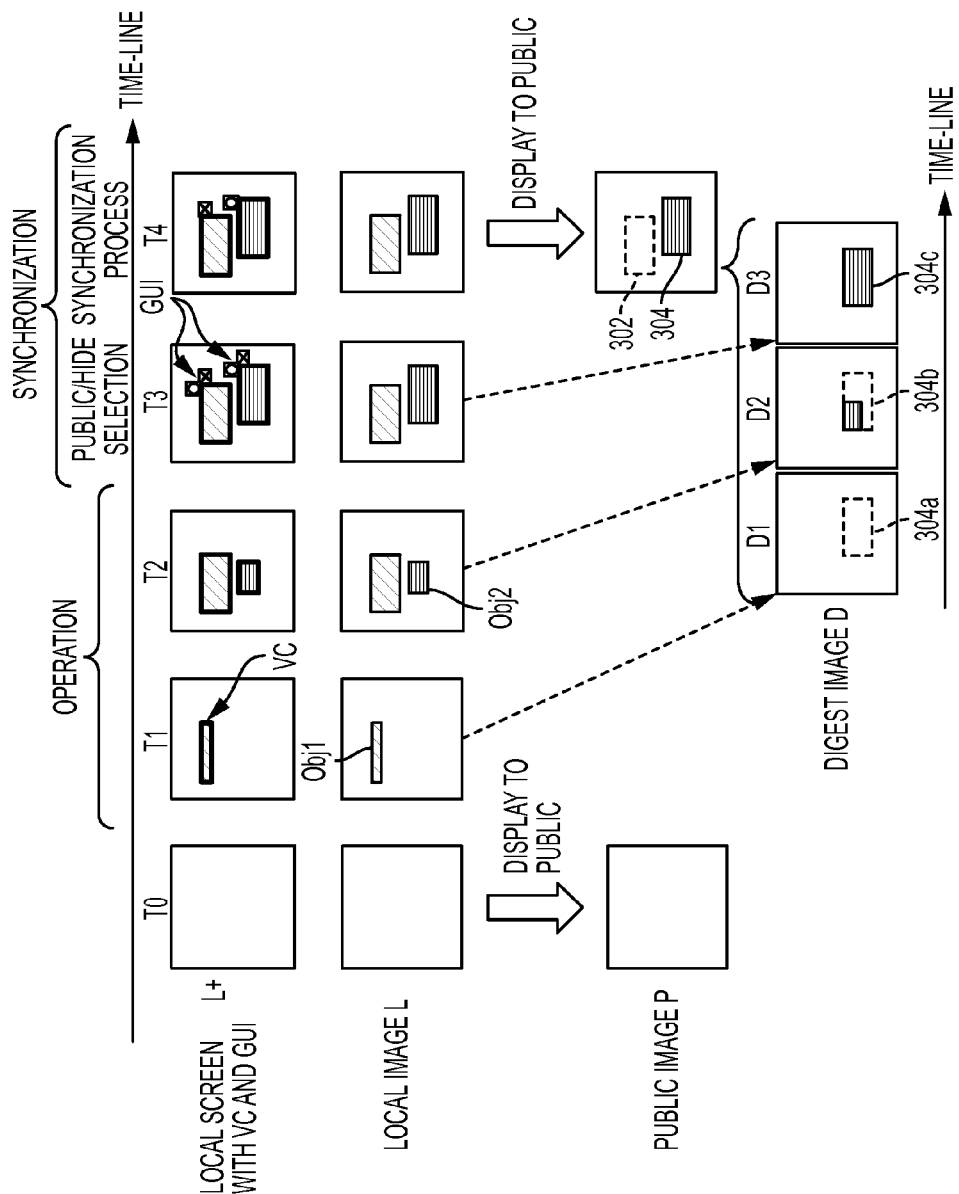
FIG. 5 is a diagram illustrating a flow of a process for synchronizing a local screen and a public screen in an embodiment.

The synchronization process in this embodiment will be described below in further detail with reference to FIGS. 5 and 6. FIG. 5 is a diagram illustrating a flow of the process for synchronizing between a local screen and a public screen in this embodiment. FIG. 5 schematically illustrates local images L acquired at time points T0 to T4, local screens L+ displaying visual cues VC and GUI components in association, and public images P displayed at the time of synchronization. Time point T0 corresponds to the previous synchronization process. At time T0, the entire local image L is permitted to be displayed to the public and the same public image P as the local image L is projected from the video output device 150.

At time points T1 and T2, objects Obj1, Obj2 such as a window and a pull-down menu are generated on the local image L in response to an input operation by an operator on the computer 110 and regions corresponding to these objects Obj1, Obj2 are extracted as differential regions that differ between the local image L (T1, T2) and the public image P'. In response to the extraction of the differential regions, visual cues VC such as frames enclosing objects Obj1, Obj2, and GUI components such as buttons for designating public or hide are displayed.

The objects Obj1, Obj2 depicted in FIG. 5 are evolving through an operation such as screen resizing. For example, object Obj1 is extracted anew as a differential region that differs between the local image L and the public image P' at times T2, T3 and T4 as well after time T1. The differential regions of object Obj1 extracted at times T2, T3 and T4 overlap one another and are therefore merged together and treated as one element. Note that the same hatching is used for the same objects throughout the time-line in FIG. 5.

At time T3, an input operation is performed on a GUI component (represented by "○" or "×" in FIG. 5) indicating a designation of whether to display to the public or hide the differential regions of objects Obj1 and Obj2. It is assumed here that, as indicated at time T4, "hide" is designated for the object Obj1 and "display to the public" is designated for the object Obj2.

In response to occurrence of the input operation event that explicitly instructs to perform the synchronization process as described above or in response to the expiration of the time interval preset in the synchronization timer 124, the synchronization flag F is set. When the flag F is detected at time T4, the synchronization process is performed. If the designation in the example described above is made, the portion 302 corresponding to the object Obj1 designated to be hidden is replaced with a mask image (such as a grayed-out, solidly whitened, or solidly blackened image) or an unupdated image, while a public image P (T4) in which the portion 304 corresponding to the object Obj2 designated to be displayed to the public is updated to the latest state is projected from the video output device 150. The portion 302 corresponding to the hidden object Obj1 is not displayed to the public until the next synchronization process.

When digest displays are to be provided, transition images of the portion corresponding to the differential region of object Obj2 to which the public attribute value has been added are generated from the stored images on the image list S that corresponds to the local images L at different time points (T1, T2 and T3), and digest images D1 to D3, which are combined images of the public image P at time T0 and transition images 304a to 304c, are output in chronological order prior to output of the public image P at time T4. The digest displays can effectively reproduce in the public image the transitions of the screen on which an operation is being performed.

Figure 6:
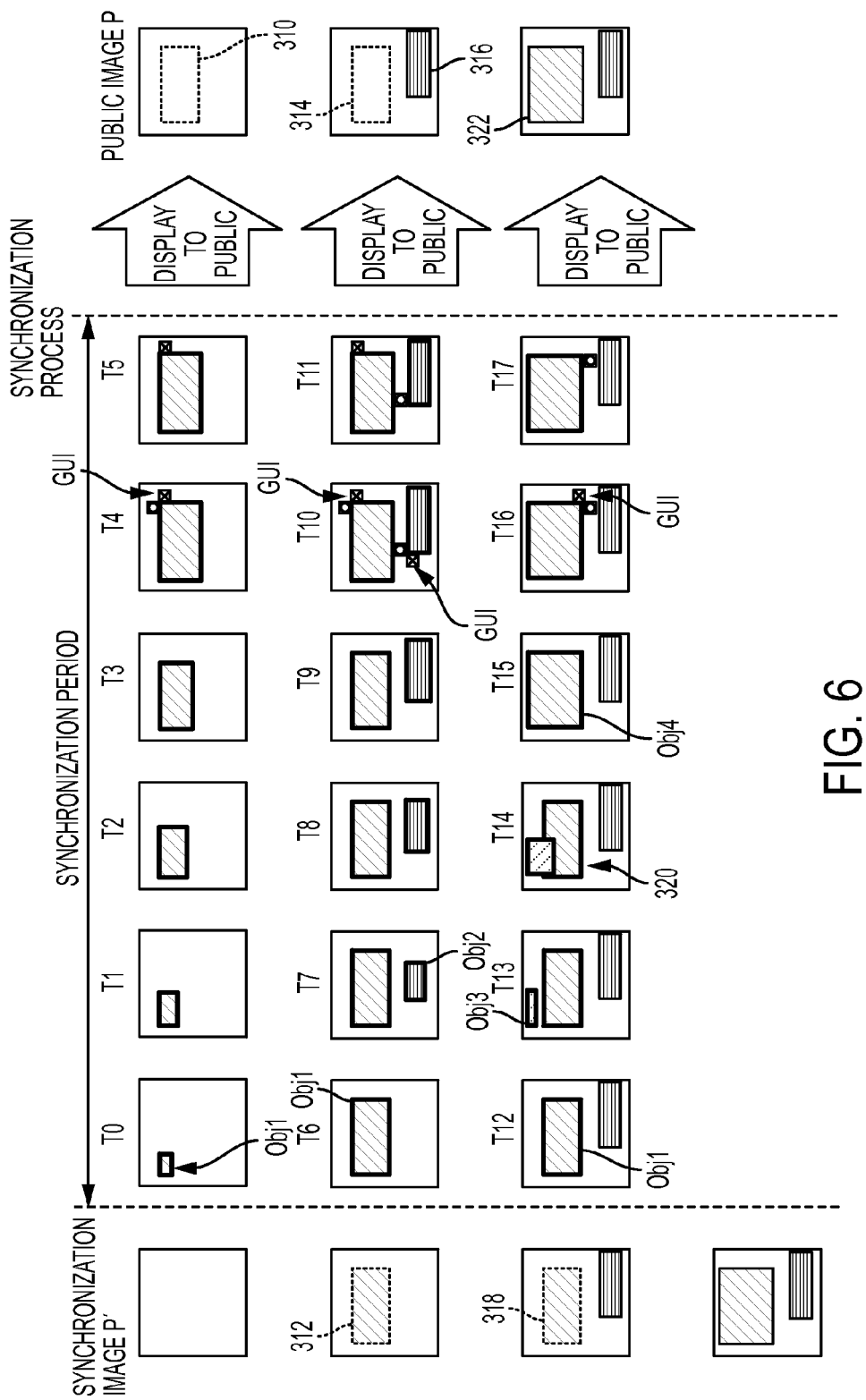
FIG. 6 is a diagram illustrating a flow of a process over a plurality of synchronization periods according to an embodiment.

FIG. 6 is a diagram illustrating a flow of a process performed over multiple synchronization periods. The term synchronization period as used herein refers to a period between the timings at which synchronization is performed. FIG. 6 schematically illustrates local screens L+ at different time points, synchronization images P' and public images P in different synchronization periods. At the start time in FIG. 6, the entire local image L is permitted to be displayed to the public, the same public image as the local image L is projected, and is stored as a synchronization image P', as in FIG. 5.

In the first period between time point T0 and time point T5, inclusive, in which the first synchronization process is performed, an object Obj1 is generated at time point T0 in response to an input operation and is extracted as a new differential region (hereinafter sometimes denoted with Obj1). At time T5, a designation to hide the differential region Obj1 is issued through the GUI and a hide attribute value is added to the differential region Obj1. In this case, a public image P is displayed to the public in which the portion 310 corresponding to the differential region Obj1 in the local image L at time T5 is hidden (as a mask image or an unupdated image). The local image L or the public image P at time T5 is stored as a synchronization image P' for the next period. A region 312 in the synchronization image P' corresponds to the differential region Obj1 to which the hide attribute value is added.

In the second period from time T6 to time T11, inclusive, in which the second synchronization process is performed, the differential region Obj1 hidden in the first period is treated as the differential region as before. The hide attribute value added to the differential region Obj1 in the first period is retained in the second period. At time point T7 in the second period, an object Obj2 is generated in response to an input operation and is extracted as a new differential region Obj2.

At time point T11, a designation to display the differential region Obj2 to the public is made through the GUI and a public attribute value is added to the differential region Obj2. For the differential region Obj1, on the other hand, an additional hide designation has been made or an explicit designation to display to the public has not been made and the hide attribute is retained. In this case, a public image P is displayed to the public in which the portion 314 corresponding to the differential region Obj1 is hidden and the portion 316 corresponding to the differential region Obj2 designated to be displayed to the public is updated to the latest state of the local image L. The local image L or the public image P at time point T11 is stored as a synchronization image P' for the next period as before. A region 318 in the synchronization image P' corresponds to the differential region Obj1 which remains hidden.

When digest displays are to be provided, transition images of corresponding portions are generated from stored images on the image list S that correspond to local images L at different time points (T6 to T10) and digest images are output in chronological order. For the differential region Obj1, on the other hand, transition images are not acquired and hidden in digest images because the explicit designation to hide has been issued in the first period and therefore it is not desirable to display transition images to the public.

In the third period from time point T12 to time point T17, inclusive, in which the third synchronization process is performed, the differential region Obj1, for which the hide attribute value is retained in the second period, is continued to be treated as a differential region. In the third period, in response to an input operation, an object Obj3 is generated at time point T13 and extracted as a new differential region Obj3. The object Obj3 is being enlarged and, at time T14, overlaps the object Obj1 as indicated by an arrow 320. In this case, the overlapping differential regions Obj3 and Obj1 are merged together and are treated as one differential region. The hide attribute value of the differential region Obj1 is retained in preference. The differential region created by merging the objects Obj1 and Obj3 is denoted with Obj4.

At time point T17, a designation to display the differential region Obj4 to the public is made through the GUI. In this case, a public image P in which the portion 322 corresponding to the differential region Obj4 is updated to the latest state of the local image L is displayed to the public and, at the same time, the local image L or the public image P at time T17 is stored as a synchronization image P' for the next period. In the next period, no differential region is carried over because there is no differential region to which the hide attribute is assigned.

When digest displays are to be provided at time T17, transition images for the differential region Obj4 before the explicit designation to display to the public are not acquired and are hidden in digest images because the hide designation has been made for the differential region Obj1 and the differential region Obj4 retains the hide attribute. Typically, differential regions to which the hide attribute has been assigned at least once in the periods are excluded from digest displays.

Figure 7:
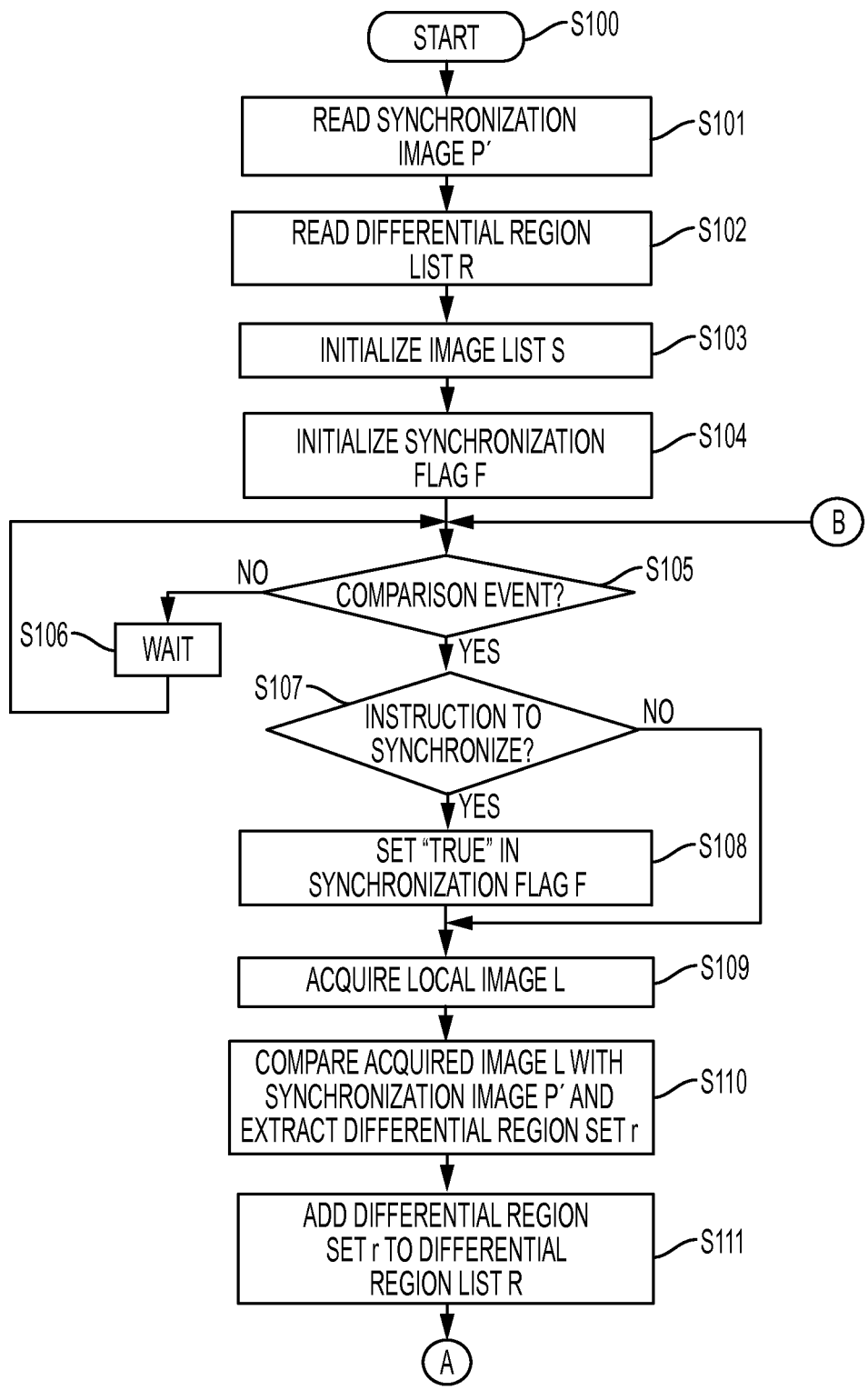
FIG. 7 is a flowchart (1/2) illustrating a process in a screen output control method performed by a computer in each synchronization period in an embodiment.
Figure 8:
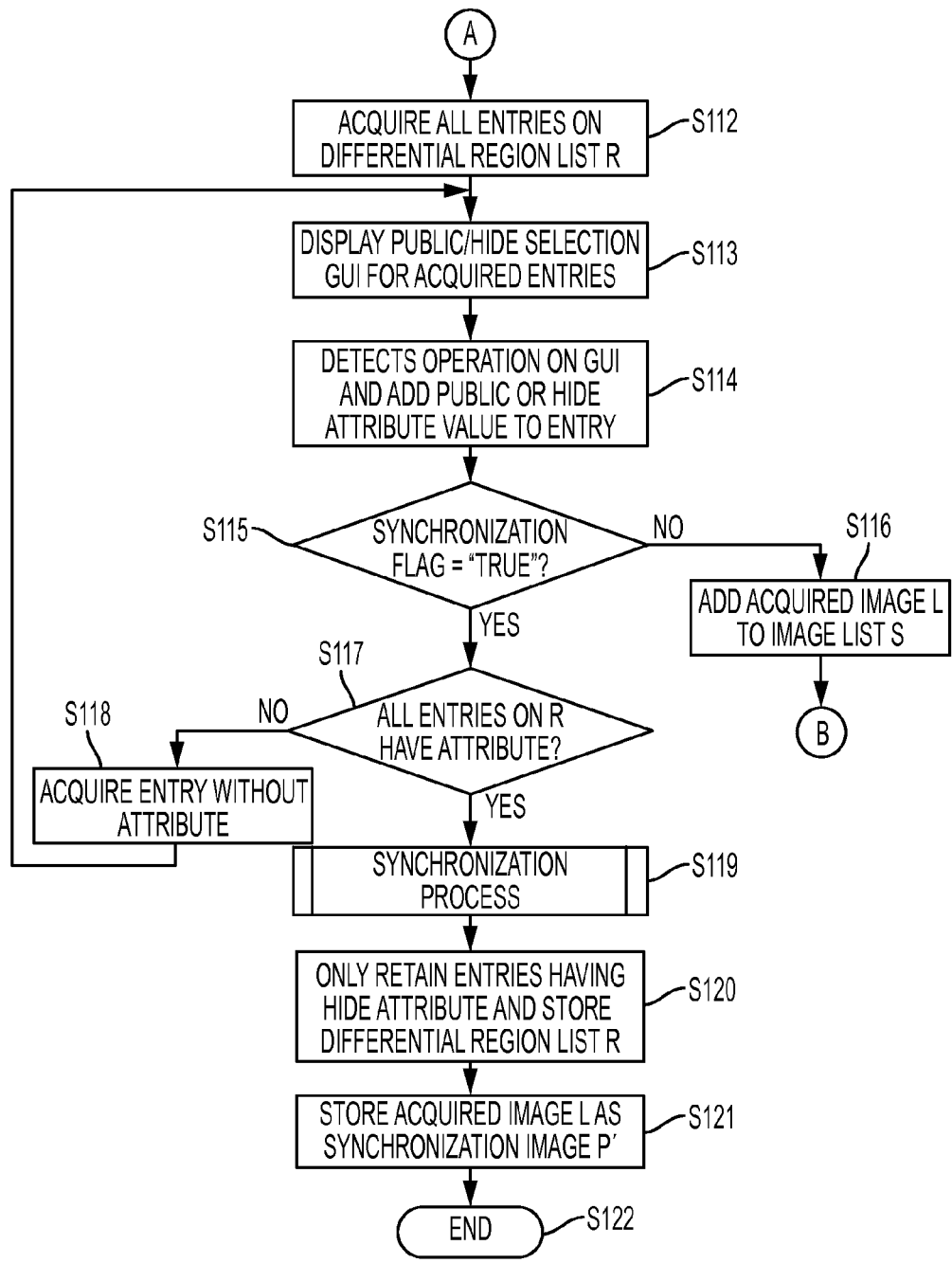
FIG. 8 is a flowchart (2/2) illustrating the process in the screen output control method performed by the computer in each synchronization period in an embodiment.
Figure 9:
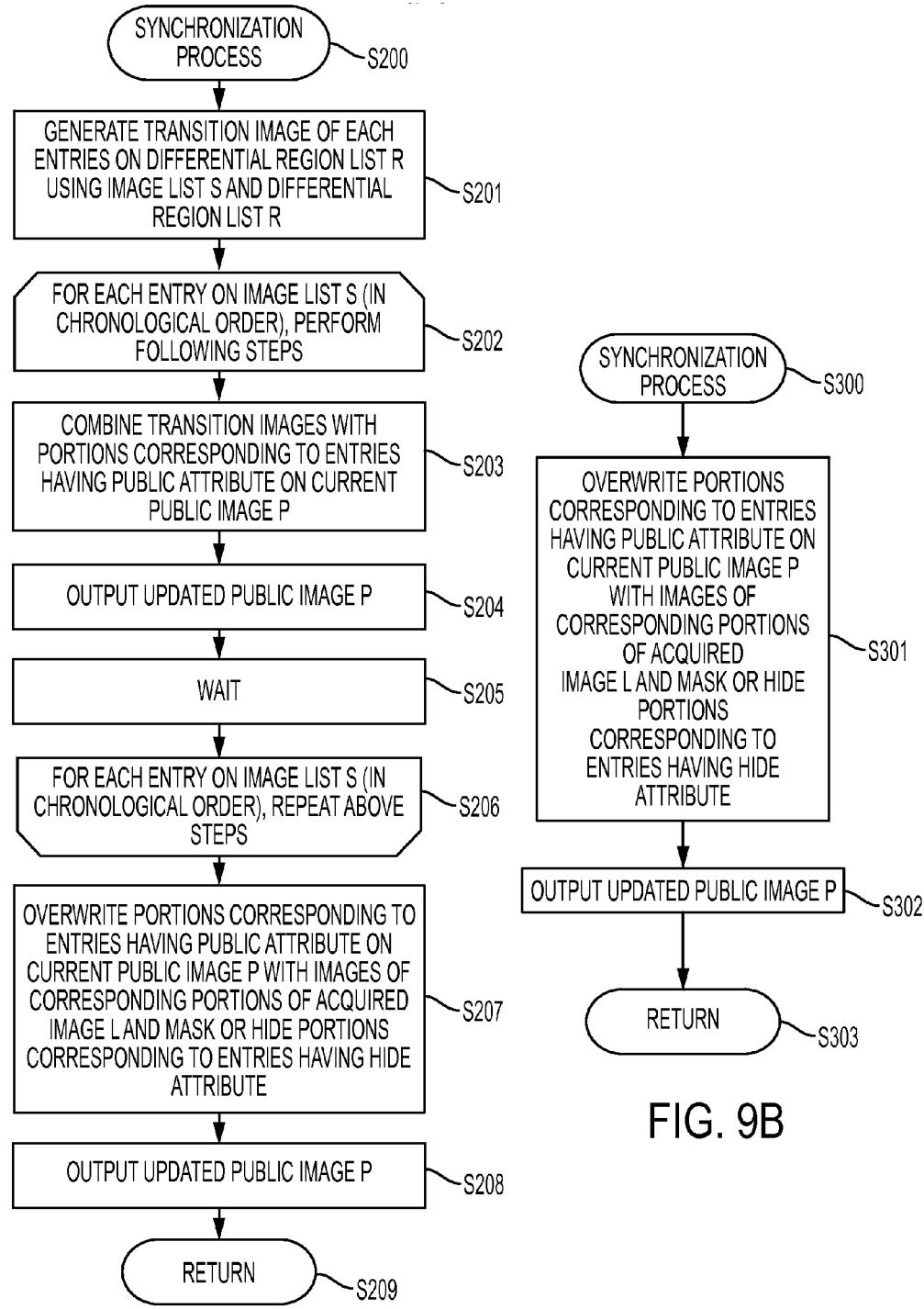
FIG. 9 is a flowchart illustrating a synchronization process according to the embodiment.

A method for controlling image output executed by a computer in this embodiment will be described below in detail with reference to FIGS. 7 to 10. FIGS. 7 and 8 are flowcharts of a process in a screen output control method executed by a computer in each synchronization period according to this embodiment. It should be noted that FIGS. 7 and 8 are linked together at points A and B in FIGS. 7 and 8. FIG. 9 is a flowchart of a synchronization process invoked at step S119 of FIG. 8.

The process illustrated in FIGS. 7 and 8 starts at step S100. The computer 110 reads a synchronization image P' from a storage device at step S101 and reads a differential region list R from the storage device at step S102. In the initial synchronization period, the synchronization image P' is a blank image and the differential region list R contains the entry of a differential region having the hide attribute corresponding to an entire local image L. The computer 110 initializes the image list S to a blank state at step S103 and initializes the synchronization flag F to "false" at step S104.

At step S105, the computer 110 determines whether or not a comparison event has occurred. The comparison event is a timer event that occurs in response to the expiration of a predetermined interval if the local image L is acquired at predetermined intervals and compared with the synchronization image P' to extract a differential region as described above. If an explicit instruction to execute the synchronization process issued from an operator is accepted, the input operation event is included in the comparison event.

If it is determined at step S105 that no comparison event has occurred (NO), the process branches to step S106, where the computer 110 waits for a predetermined period of time, then loops the process back to step S105 and waits for a comparison event. On the other hand, if it is determined at step S105 that a comparison event has occurred (YES), the process proceeds to step S107.

At step S107, the computer 110 determines whether or not an explicit or implicit instruction to synchronize has been issued. If the designation input unit 118 has accepted an input operation corresponding to an explicit instruction to synchronize or a timer event of the synchronization timer 124 has occurred, it is determined at step S107 that an instruction to synchronize has issued. If it is determined that a instruction to synchronize has been issued (YES) at step S107, the process proceeds to step S108, where the computer 110 sets a value "true" in the synchronization flag F, then the process proceeds to step S109. On the other hand, if it is determined at step S107 that an instruction to synchronize has not been issued (NO), the process directly proceeds to step S109.

At step S109, the computer 110 acquires a local image L by means of the local image acquiring unit 112 and stores the local image L in a storage device. At step S110, the computer 110 compares the acquired image L with the synchronization image P' and extracts a set r of differential regions by means of the differential region extracting unit 114. At step S111, the computer 110 adds the newly extracted set r of differential regions to the differential region list R by means of the differential region extracting unit 114.

If a new differential region that overlaps an existing differential region on the differential region list R is extracted, those regions are merged into a single differential region at step S111 described above. An embodiment of the single differential region is a minimum rectangular region that encompasses the plurality of differential regions prior to be merged. Here, differential regions corresponding to the same object described with reference to FIG. 5 and differential regions corresponding to a plurality of overlapping objects as described with reference to FIG. 6 are merged.

After step S111, the process proceeds to step S112 illustrated in FIG. 8 through point A. The computer 110 acquires all entries (differential regions) on the differential region list R at step S112 and causes the UI display unit 116 to display a designation accepting screen for making a selection between public and hide for each of the acquired entries on the main display 140.

Figure 10:
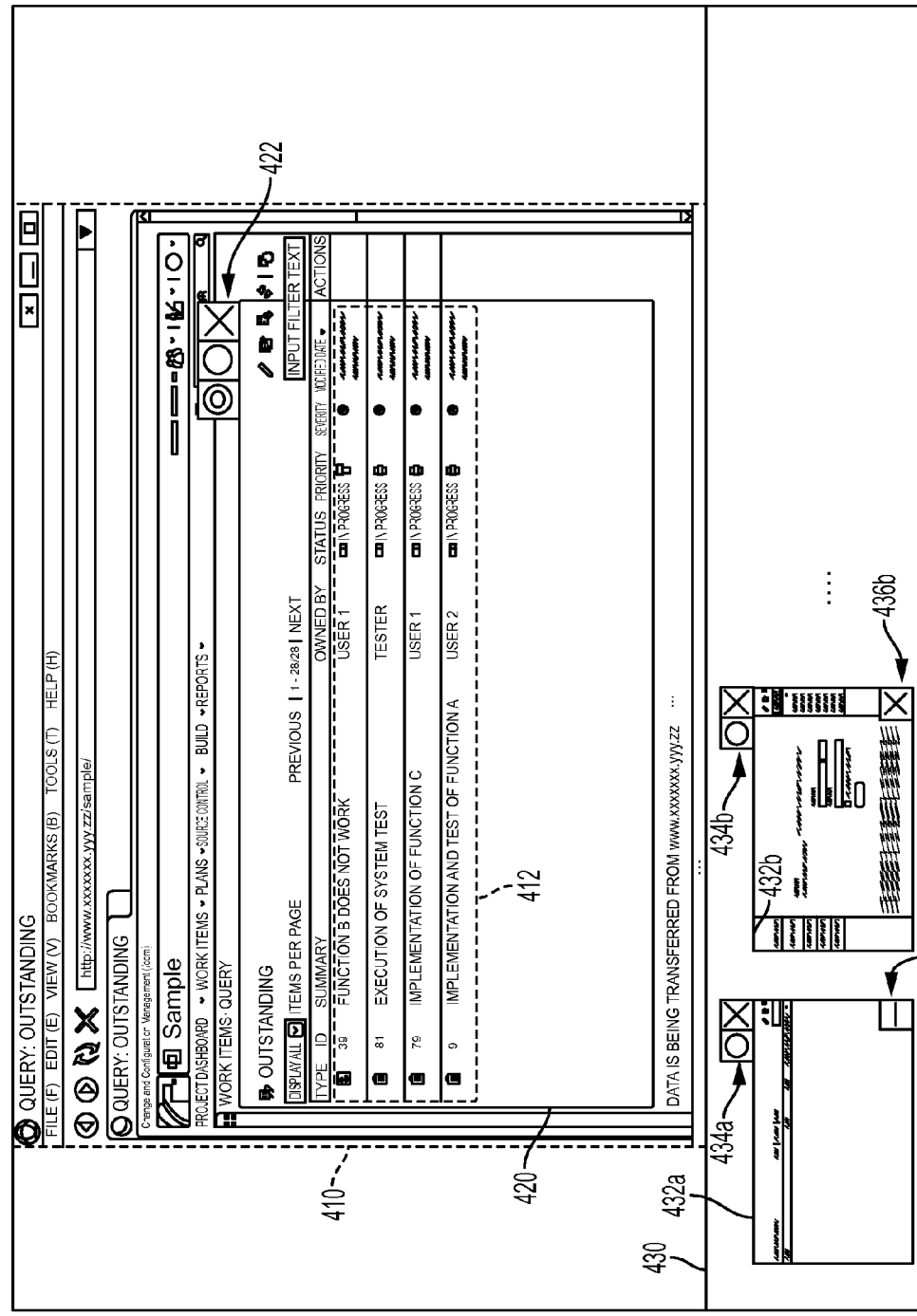
FIG. 10 is a diagram illustrating a designation accepting screen displayed on a main display in an embodiment.

FIG. 10 is a diagram illustrating a designation accepting screen 400 displayed on the main display 140 in this embodiment. The designation accepting screen 400 illustrated in FIG. 10 includes a projection object area 410 in which visual cues VC and GUI components are superimposed on a local image L. The size of the projection object area 410 is dependent on the resolution of the video output device 150. A frame 420 surrounding a differential region is provided in the projection object area 410 and GUI components 422 that accept designations of whether or not to display the differential region surrounded by the frame 420 to the public are provided adjacent to the frame 420. The functions of the GUI components 422 illustrated in FIG. 10 will be described later in detail.

Returning to FIG. 8, the computer 110 detects an input operation performed on the GUI components through the designation input unit 118 and adds the public attribute value or the hide attribute value to the element (differential region) at step S114. At step S115, the computer 110 determines whether the value of the synchronization flag F is "true" or not. If it is determined at step 115 that the value of the synchronization flag is not "true" (NO), the process branches to step S116. At step S116, the computer 110 adds the acquired image L to the image list S and the process loops back to step S105 through point B.

The flow from step S105 to step S116 is repeated until the synchronization flag is set in response to an explicit or implicit instruction. As a result, differential regions that differ between a local image L and a synchronization image P' are extracted at different time points, merge is performed as appropriate, and differential regions including differences up to the present time point are extracted. The differential region surrounded by the frame 420 in FIG. 10 includes all differences between the previous public image P' and images up to the current time point whereas the region 412 in FIG. 10 shows differential regions that differ between the current local image L and the previous synchronization image P'. Concurrently, local images L at different time points are added to the image list S in sequence for digest displays. The flow from steps S105 to S116 is repeated at the predetermined intervals. It is possible that selection between public and hide for some differential regions cannot be detected at step S114. In that case, the process is continued without adding an attribute.

Returning to FIG. 10, the designation accepting screen 400 illustrated in FIG. 10 further includes a transition image display area 430 that displays thumbnail images 432a, 432b . . . of portions of the local image that correspond to the differential regions and have been acquired at different time points.

The thumbnail images 432 correspond to transition images of differential regions for digest displays. GUI components 434 that accept a designation of whether to display to the public or hide are provided in each of the thumbnail images 432 and an attribute display 436 displaying an attribute already set is provided in each of the thumbnail images 432. By clicking on the GUI components 434, each transition image can be specified and a selection between display to the public ("○" button) and hide ("x" button) can be made for the transition image. In this way, attribute values of differential regions are stored in a time-line in association with transition screens acquired from the stored images on the image list S. The time-line of the attribute values holds a set of attribute values like "--10" (where "-" represents "no attribute", 1 represents the public attribute value, and 0 represents the hide attribute value), for example.

The provision of the transition image display area 430 described above on the designation accepting screen enables an operator to check to see whether the image list S contains an image that has been accidentally stored and should not be displayed to the public and, if such an image is contained, to designate to hide the image. In the example in FIG. 10, a login panel is displayed in thumbnail image 432b, representing that the login panel was displayed due to timeout in a synchronization period. Information that should not be displayed to the public, such as a user name, can be displayed on the login panel. A transition screen corresponding to the thumbnail image 432b can be set to a hidden state to advantageously prevent the information from being revealed.

While the transition image display area 430 is located at the bottom of the screen in the example in FIG. 10, the location of the transition image display area 430 is not limited to the bottom. In an alternative embodiment, the transition image display area 430 may be located to the right or left of the projection object area 410. If the computer 110 includes an additional display, the transition image display area 430 may be displayed on that additional display.

The functions of the GUI components associated with differential regions in the projection object area 410 will be described below. In the example in FIG. 10, the "◉" button has the function of designating to display all images, including transition images, to the public, the "○" button has the function of designating to hide a transition image and display only the current image to the public. The "x" button has the function of designating to hide the current image as well as a transition image. In the example illustrated in FIG. 10, the transition image (corresponding to the thumbnail image 432b) in which a login panel is displayed is explicitly set to be hidden "x" button and therefore the "◉" button among the GUI components 422 for designating to display all transition images to the public may be deactivated. The input operations for designating whether to display to the public or hide differential regions is not limited to operations on GUI components. For example, a command for choosing to display to the public or hide all differential regions during an entire synchronization period with a single action may be assigned to a shortcut key.

Returning to FIG. 8, if it is determined at step S115 that the value of the synchronization flag is "true" (YES), the process branches to step S117. At step 117, the computer 110 determines whether or not all of the entries on the differential region list R have one of the public attribute value or the hide attribute value. If it is determined at step S117 that there is an entry that does not have an attribute because an explicit designation has not been made (NO), the process branches to step S118. At step S118, the computer 110 acquires the entry that does not have an attribute, loops the process back to step S113, and displays the GUI components again for making a selection between hide and display to the public for the acquired entry (differential region).

In the embodiment described, if it is determined that there is an entry that does not have an attribute (NO), the GUI components are displayed again at step S118. However, in alternative embodiment, an entry that does not have an attribute when the synchronization flag is set may be treated as being implicitly designated to be hidden and the process may proceed to step S119.

On the other hand, if it is determined at step S117 that all of the entries on the differential region list R have one of the public or hide attributes (YES), the process proceeds to step S119. The computer 110 performs a synchronization process, which will be described later with reference to FIG. 9(A) or 9(B), at step S119 and stores the differential region list R with only the entries having the hide attribute in the storage device at step S120. In doing this, the computer 110 resets the attribute values set for the differential regions.

The computer 110 writes the current acquired image L as a synchronization image P' at step S121 and ends the process of this synchronization period at step S122. Note that since differential regions having the hide attribute are directly carried over to the next period as differential regions, a public image P after the synchronization process instead of the acquired image L may be written as the synchronization image P' at step S121. The process illustrated in FIGS. 7 and 8 is performed in every synchronization period. Accordingly, after the process is completed at step S122, the process is repeated from step S100 for the next synchronization period.

Synchronization processes will be described with reference to FIGS. 9(A) and 9(B). FIG. 9(A) is a flowchart of a synchronization process when digest displays are to be provided. The process illustrated in FIG. 9(A) is invoked at step S119 of FIG. 8 and starts at step S200. At step S201, the computer 110 uses the image list S and the differential region list R to acquire images corresponding to the entries having the public attribute value on the differential region list R from among the stored images on the image list S and generates transition images through transition image generating unit 122. Here, corresponding transition images are not generated for differential regions having the public attribute added by a designation to display to the public ultimately made if there is the hide attribute in the time-line because designation to hide has been selected in the course of the process or the hide setting has been made in an area such as the transition image display area 430 illustrated in FIG. 10.

In the loop from step S202 to step S206, the process from step S203 to step S205 is performed for each of the entries on the image list S (stored images) in chronological order. At step S203, the computer 110 combines the transition images with portions corresponding to entries on the current public image P that have the public attribute. The computer 110 outputs the updated image through the public screen output unit 120 at step S204 and waits for a frame advance interval at step S205.

In the loop from step S202 to step S206, digest displays are provided as frame-by-frame advance of still images including transition images. Once the loop from step S202 to step S206 is exited, the computer 110 uses the public screen output unit 120 at step S207 to overwrite the portions of the current public image P that correspond to the entries having the public attribute with the images of corresponding portions of the current acquired image L to mask or hide the portions corresponding to the entries ultimately designated to be hidden. The computer 110 outputs the updated public image P through the public screen output unit 120 at step S208, then ends the process at step S209 and returns the control to the process illustrated in FIG. 8.

FIG. 9(B) is a flowchart of a synchronization process when digest displays are not presented. The process illustrated in FIG. 9(B) is invoked at step S119 of FIG. 8 and starts at step S300. At step S301, the computer 110 uses the public screen output unit 120 to overwrite the portions of the current public image P that correspond to the entries having the public attribute with the images of the corresponding portions of the current acquired image L to mask or hide the portions corresponding to the entries ultimately designated to be hidden. The computer 110 outputs the updated public image P through the public screen output unit 120 at step S302, ends the process at step S303 and returns the control to the process illustrated in FIG. 8. Note that whether or not to provide the digest displays may be specified as a user setting in the screen output control software, for example.

Figure 11:
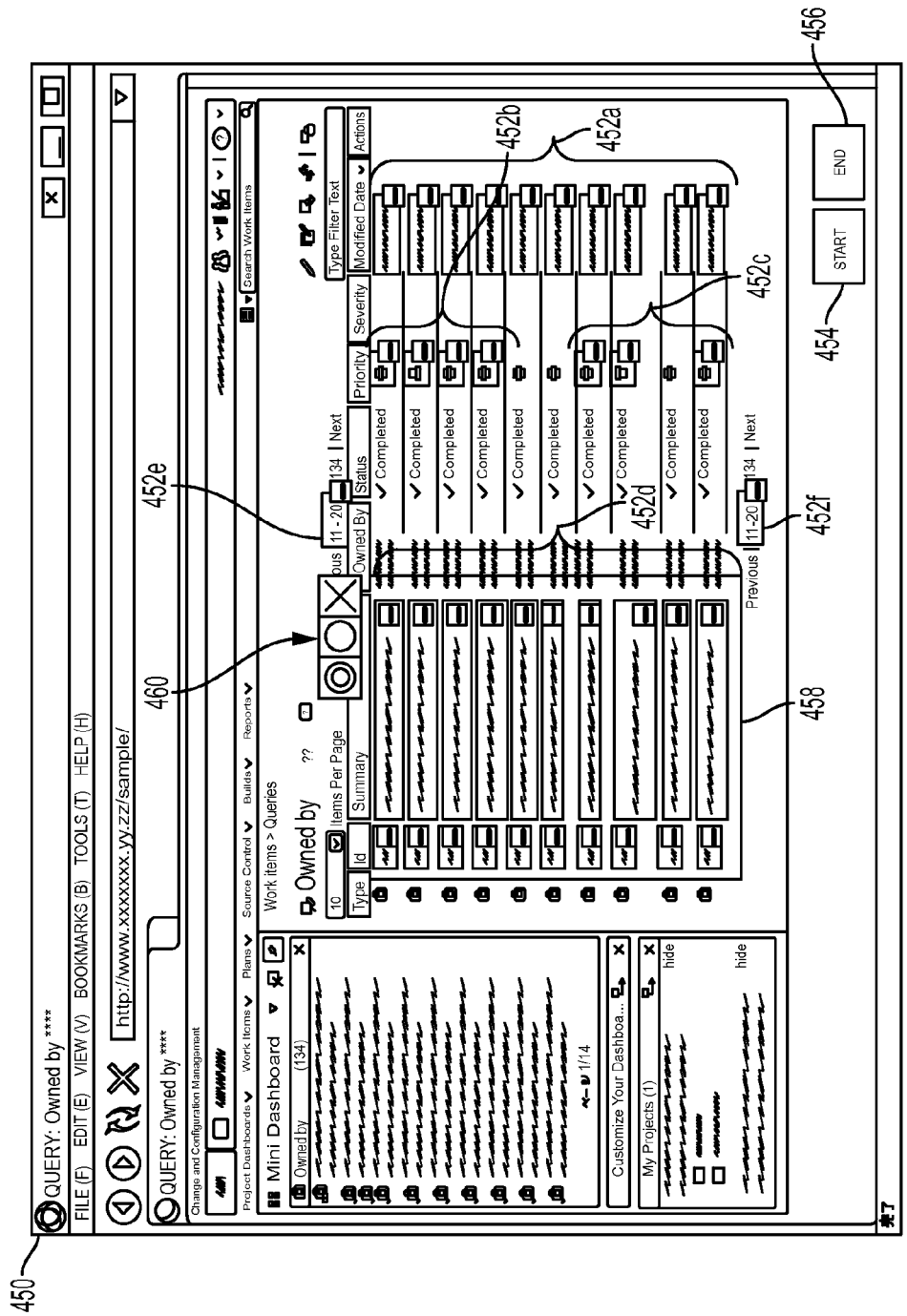
FIG. 11 is a diagram illustrating a projection area of the designation accepting screen displayed on the main display in an embodiment.
Figure 12:
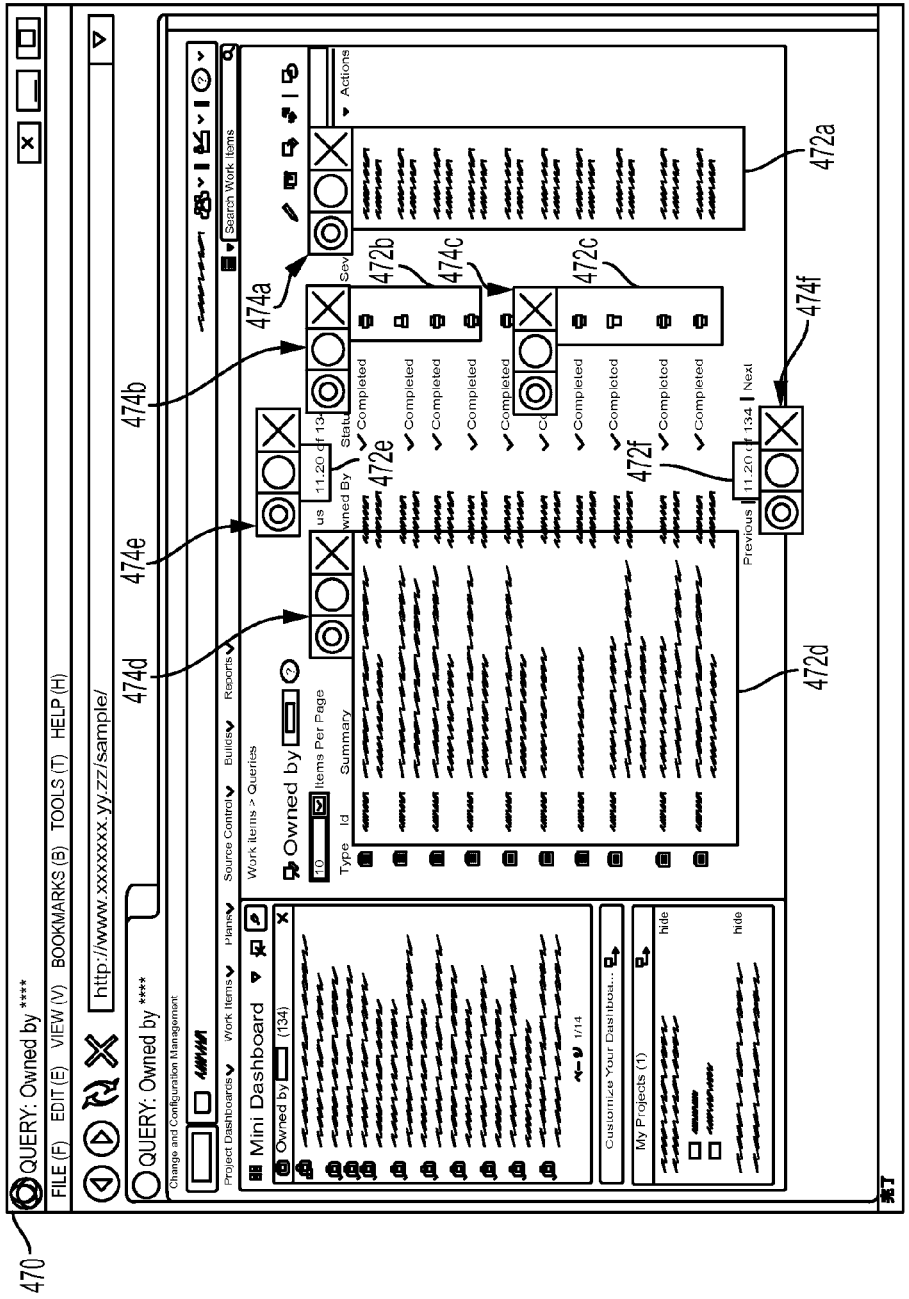
FIG. 12 is a diagram illustrating a projection area of the designation accepting screen displayed on the main display in an embodiment.

The designation accepting screen will be described below in further detail with reference to FIGS. 11 and 12. FIGS. 11 and 12 are diagrams illustrating projection object areas 450, 470 of a designation accepting screen displayed on the main display 140 in this embodiment. As has been described with reference to FIG. 10, the designation accepting screen 400 of this embodiment includes GUI components 422 that accept a designation of whether to display to the public or hide each differential region extracted. When many groups of differential region groups 452a to 452f are extracted as illustrated in FIG. 11, making designation for each differential region imposes heavy workload on the operator.

To address this, GUI components for collectively accepting designations of whether to display to the public or hide a plurality of differential regions and operation event handling may be provided in the designation accepting screen 400 as illustrated in FIG. 11 for cases such as when more than a certain number of differential regions are extracted. In the projection object area 450 illustrated in FIG. 11, frames and attribute displays are disposed for the differential regions in the differential region groups 452a to 452f. In addition, a selection start button 454 and a selection end button 456 are provided.

When the selection start button 454 illustrated in FIG. 11 is clicked, an operation for collectively accepting selections for differential regions at a time is started. The operator can specify a range 458 surrounding desired differential regions with the mouse to collectively specify the differential regions to designate to hide or display to the public. In the example in FIG. 11, the differential region group 452d are surrounded and specified as the selection range 458. Once the selection range 458 has been specified, GUI components 460 are displayed so that hide or display to the public can be designated for the differential regions in the differential region group 452d at a time. When the selection end button 456 is clicked after the operation described above is repeated, the specification of whether to display to the public or hide differential regions ends.

In this embodiment, a plurality of differential regions that meet a given combining condition may be visually collectively represented and GUI components accepting designation of whether to display to the public or hide the plurality of differential regions may be provided in the designation accepting screen 400 as illustrated in FIG. 12 for cases such as when more than a certain number of differential regions are extracted or where differences smaller than a certain magnitude of difference are extracted. The combining condition may be for detecting differential regions closer to one another than a certain distance, such as within a predetermined range, or a condition for detecting vertically or horizontally adjacent differential regions. In the example illustrated in FIG. 12, the differential region groups 452a, 452b, 452c and 452d illustrated in FIG. 11 are bracketed with frames 472a, 472b, 472c and 472d, respectively, and GUI component groups 474a, 474*b*, 474*c* and 474*d* to accept designation of whether to hide or display to the public, respectively, are displayed.

Figure 13A:
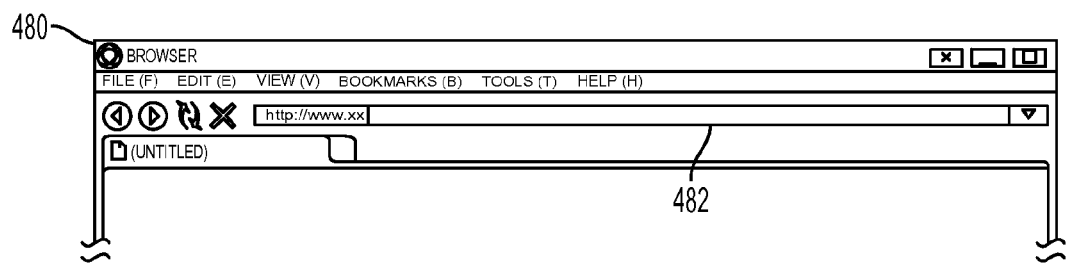
FIG. 13 depicts (A) a diagram illustrating a browser screen and (B) a diagram of a definition pattern for identifying a uniform resource locator (URL) specifying portion according to an embodiment.

Display locations of some extracted differential regions may be predetermined and can be predicted in such a case of a URL designation portion on the browser. For such differential regions, the public attribute value or the hide attribute value can be set by the predetermined region detecting unit 130 described above without requesting the operator to make designation. FIG. 13(A) illustrates a browser screen 480 and FIG. 13(B) illustrates a definition pattern 486 that can be applied to the browser for identifying a URL designation portion 482.

Figure 13B:
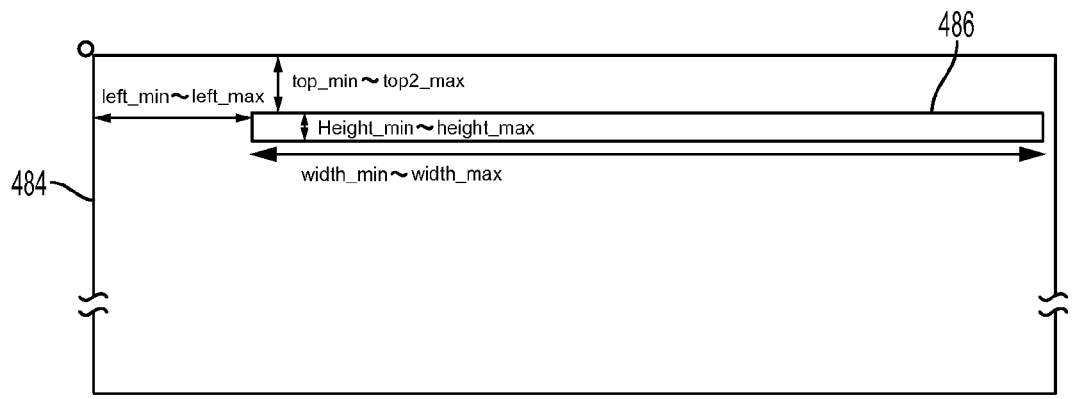

The definition pattern 486 illustrated in FIG. 13(B) can be associated with a window object (or a handle) 484 of the web browser, rather than the screen, so that the URL designation portion 482 can be identified even when the location of the web browser of a parent window is changed, and can be represented by a relative position with the origin located at a position of the window object 484. The definition pattern 486 may include a window name or window ID or the like unique to the target region for acquiring the window object, the minimum and maximum value of the left position, the minimum and maximum value of the top position, the minimum and maximum value of the width, and the minimum and maximum value of the height of the region.

The predetermined region detecting unit 130 applies the definition pattern 486 as illustrated in FIG. 13(B) to the entries on the differential region list R. If an entry matches the definition pattern, the predetermined region detecting unit 130 can detect the entry as a predetermined differential region and add a predetermined attribute value (the public or hide attribute value) associated with the matching definition pattern to the differential region. While the predetermined attribute value may be set using pattern matching after a differential region is detected, coordinate information of a region where the URL designation portion will be displayed and a predetermined attribute value may be preset as user settings in advance before actual extraction of a differential region.

Figure 15:
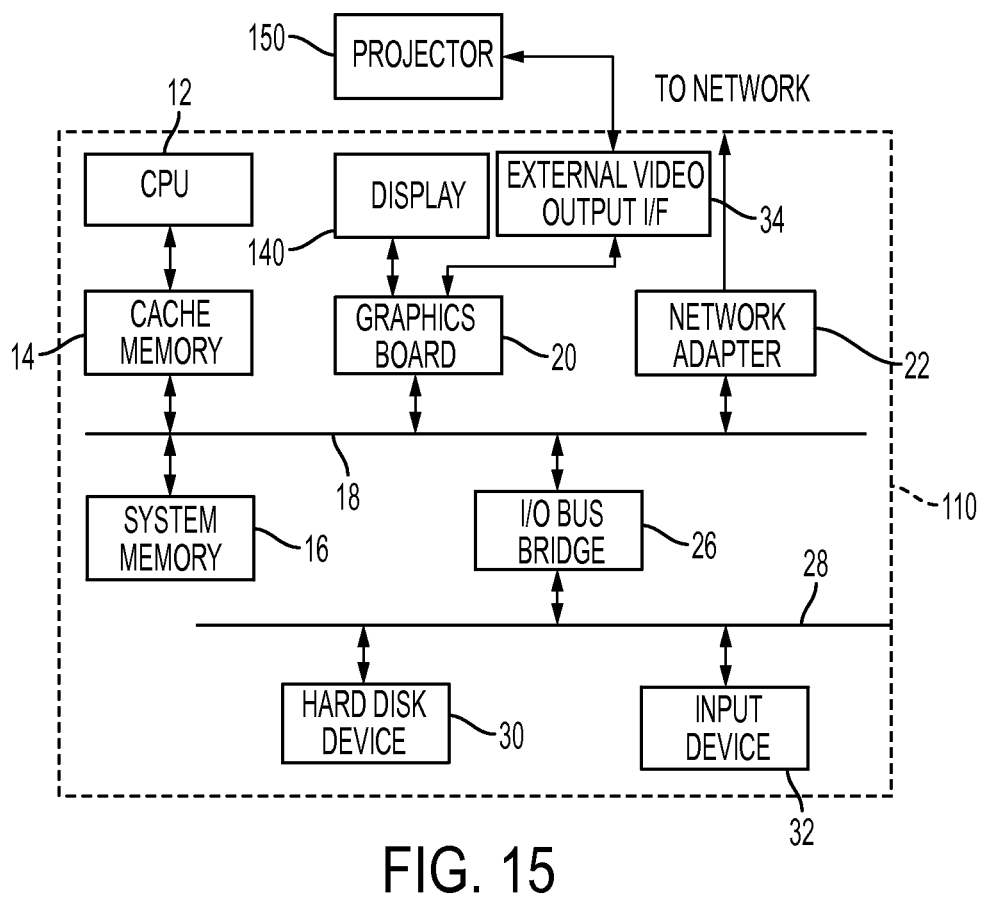
FIG. 15 is a diagram illustrating an embodiment of a hardware configuration of a computer.

A hardware configuration of a computer according to the present embodiment will be described. FIG. 15 illustrates one embodiment of the hardware configuration of the computer 110. The computer 110 illustrated in FIG. 15 is generally configured as a general-purpose computer such as a personal computer or a workstation. The computer 110 illustrated in FIG. 15 includes a central processing unit (CPU) 12, a cache memory 14 which enables fast access to data used by the CPU 12 and has levels such as L1 and L2, and a system memory 16 implemented by a solid-state memory such as a RAM or DRAM which enables processing by the CPU 12.

The CPU 12, the cache memory 14 and the system memory 16 are connected to a driver, a graphics board 20 and a network adapter 22 through a system bus 18. The graphics board 20 is connected to a main display 140 through the bus and allows a result of processing by the CPU 12 to be displayed on a display screen. The graphics board 20 is connected to an external video output interface 34 and allows an external video output device (projector) 150 connected to the computer 110 through the external video output interface 34 to display a result of processing by the CPU 12. The network adapter 22 enables the computer 110 to be connected to remote terminals 160 through a network 102 that uses an appropriate communication protocol such as transmission control protocol and internet protocol (TCP/IP) on the physical layer level and the link layer level.

An input/output (I/O) bus bridge 26 is also connected to the system bus. A hard disk storage device 30 is connected downstream from the I/O bus bridge 26 through an I/O bus 28 such as a peripheral component interconnect (PCI) bus using integrated drive electronics (IDE), AT Attachment (ATA), AT Attachment Packet Interface (ATAPI), serial ATA, small computer system interface (SCSI), or universal serial bus (USB). Input devices 32 such as a keyboard and a pointing device such as a mouse are also connected to the I/O bus 28 through a bus such as a USB.

The CPU 12 of the computer 110 may be any single-core processor or multi-core processor and is controlled by an appropriate operating system such as WINDOWS (registered trademark) XP, WINDOWS (registered trademark) 7, UNIX (registered trademark), or LINUX (registered trademark). The remote terminals 160 can be implemented with a hardware configuration similar to the one illustrated in FIG. 15.

According to the embodiments described above, changed portions of a local image (first image) and a public image (second image) are detected and a public image to be output to the video output device 150 is updated in accordance with a designation to display to the public or hide the changed portions. Only the portions of the local image that correspond to differential regions for which a designation to display to the public has been accepted are incorporated into the updated public image. Accordingly, the portions of the local image are incorporated into the public image after accepting designation to display to the public. Therefore, information that should not be displayed to the public can be prevented from being output. Furthermore, since updated portions are detected as differential regions, the present disclosure can be advantageously applied to situations where it is difficult to identify portions to be masked in advance.

As has been described above, according to embodiments of the present disclosure, a changed portion of a screen is detected and is output depending on whether the changed portion is designated to be displayed to the public or to be hidden. Thus, the present disclosure can provide an information processing apparatus, a screen output system, a screen output control method and program that enable screen output with consideration for the release of information.

The functions according to the embodiments described above can be implemented by a computer-executable program written in a legacy programming language such as C, C++, C#, or Java (registered trademark) or an object-oriented programming language and can be distributed as a program stored on a computer-readable recording medium such as a read-only memory ROM, electrically erasable programmable read-only memory (EEPROM), erasable programmable read only memory (EPROM), flash memory, flexible disk, compact disk ROM (CD-ROM), compact disc-rewritable (CD-RW), digital versatile disc ROM (DVD-ROM), DVD-RAM, DVD-RW, Blu-ray disc, a secure digital (SD) card, and Magneto-optical drive (MO), or through an electrical communication network.

While the present disclosure has been described with particular embodiments, the present disclosure is not limited to these embodiments. Other embodiments of the present disclosure are possible and additions, modifications, and omissions of elements that can occur to those skilled in the art can be made and any of such modes are fall within the scope of the present disclosure as long as the operations and effects of the present disclosure can be achieved.

The invention claimed is:
1. An information processing apparatus having a plurality of display outputs, comprising:
   an image acquiring unit configured to acquire a first image for output to a first display;

a differential region extracting unit configured to extract a differential region between the first image and a second image for output to a second display for viewing by a plurality of viewers;

a designation accepting unit configured to accept a designation of whether a differential region is output to the second display for each differential region, the designation for each differential region based solely on content of the differential region; and an image output unit configured to incorporate a portion of the first image that corresponds to the differential region for which a designation of output has been accepted into the second image and to output the updated second image to the second display, wherein the same updated second image is output to the second display for viewing by the plurality of viewers.

2. The information processing apparatus according to claim 1, wherein the image acquiring unit is configured to acquire the first image at a plurality of time points and the image output unit is configured to incorporate portions of the first image that correspond to differential regions for which a designation of output has been accepted into the second image in chronological order and to output the updated second image to the second display in sequence.

3. The information processing apparatus according to claim 1, wherein the designation accepting unit is configured to add a public attribute or a hide attribute to a differential region in response to the designation of whether to output the differential region and the differential region extracting unit is configured to merge a plurality of different differential regions to generate one differential region inheriting the hide attribute in preference to the public attribute.

4. The information processing apparatus according to claim 1, wherein the image acquiring unit is configured to acquire the first image at a plurality of time points, the designation accepting unit is configured to add the public attribute or the hide attribute to a differential region in response to the designation of whether to output the differential region, the differential region extracting unit is configured to merge a plurality of differential regions overlapping one another to generate one differential region inheriting the hide attribute in preference to the public attribute, and the image output unit is configured to incorporate portions of the first image that correspond to differential regions for which the designation of output has been accepted, except for a portion to which the hide attribute is added, into the second image in chronological order and to output the updated second image to the second display in sequence.

5. The information processing apparatus according to claim 1, further comprising a predetermined differential region detecting unit configured for using a pattern for identifying a differential region for which a designation of whether to output the differential region is specified beforehand for detecting a predetermined differential region that matches the pattern.

6. The information processing apparatus according to claim 1, further comprising a display unit configured for causing the first display to display a designation accepting screen provided on the first image, the designation accepting screen configured for visually showing each of the differential regions and associating each of the differential regions with image components for accepting the designation of whether to output the differential region.

7. The information processing apparatus according to claim 6, comprising an image distributing unit configured for distributing the designation accepting screen to one or more external information processing apparatuses through a network, wherein the designation accepting unit is configured for receiving the designation of whether to output a differential region from the one or more external information processing apparatuses through the designation accepting screen.

8. The information processing apparatus according to claim 6, wherein the designation accepting screen includes an image component and an operation event process for collectively accepting the designations of whether to output a plurality of differential region.

9. The information processing apparatus according to claim 6, wherein the designation accepting screen is configured for visually collectively showing a plurality of differential regions that meet a combining condition and includes an image component collectively accepting the designations whether to output a plurality of differential regions that meet the combining condition.

10. The information processing apparatus according to claim 1, wherein the differential region is represented by a minimum geometrical figure that encompasses a portion that differs between the first image and the second image, and a portion of the second image for which a designation to not output has been accepted is provided as a masked image or an updated image.

11. A screen output system comprising a first information processing apparatus having a plurality of display outputs and a second information processing apparatus, the first information processing apparatus comprising:

an image acquiring unit configured to acquire a first image for output to a first display;

a differential region extracting unit configured to extract a differential region between the first image and a second image for output to a second display for viewing by a plurality of viewers;

a designation accepting unit configured to accept a designation of whether a differential region is output to the second display from one or both of the first information processing apparatus and the second information processing apparatus over one of a network and an input device of the first information processing apparatus, for each differential region, the designation for each differential region based solely on content of the differential region; and an image output unit configured to incorporate a portion of the first image that corresponds to the differential region for which a designation of output has been accepted into the second image and to output the updated second image to the second display, wherein the same updated second image is output to the second display for viewing by the plurality of viewers.

12. The screen output system according to claim 11, wherein the image acquiring unit is configured to acquire the first image at a plurality of time points and the image output unit is configured to incorporate portions of the first image that correspond to differential regions for which a designation of output has been accepted into the second image in chronological order and to output the updated second image to the second display in sequence.

13. The screen output system according to claim 11, wherein the designation accepting unit is configured to add a public attribute or a hide attribute to a differential region in response to the designation of whether to output the differential region and the differential region extracting unit is configured to merge a plurality of different differential regions to generate one differential region inheriting the hide attribute in preference to the public attribute.

14. The screen output system according to claim 11, wherein the image acquiring unit is configured to acquire the first image at a plurality of time points, the designation accepting unit is configured to add the public attribute or the hide attribute to a differential region in response to the designation of whether to output the differential region, the differential region extracting unit is configured to merge a plurality of differential regions overlapping one another to generate one differential region inheriting the hide attribute in preference to the public attribute, and the image output unit is configured to incorporate portions of the first image that correspond to differential regions for which the designation of output has been accepted, except for a portion to which the hide attribute is added, into the second image in chronological order and to output the updated second image to the second display in sequence.

15. The screen output system according to claim 11, further comprising a predetermined differential region detecting unit configured for using a pattern for identifying a differential region for which a designation of whether to output the differential region is specified beforehand for detecting a predetermined differential region that matches the pattern.

16. The screen output system according to claim 11, further comprising a display unit configured for causing the first display to display a designation accepting screen provided on the first image, the designation accepting screen configured for visually showing each of the differential regions and associating each of the differential regions with image components for accepting the designation of whether to output the differential region.

17. A screen output control method for implementation by an information processing apparatus having a plurality of display outputs, the method comprising:
- acquiring, by the information processing apparatus, a first image for output to a first display;
- extracting, by the information processing apparatus, a differential region between the first image and a second image for output to a second display for viewing by a plurality of viewers;
- accepting, by the information processing apparatus, a designation of whether a differential region is output to the second display for each differential region, the designation for each differential region based solely on content of the differential region; and
- incorporating, by the information processing apparatus, a portion of the first image that corresponds to the differential region for which a designation of output has been accepted into the second image in response to a synchronization event and outputting the updated second image to the second display, wherein the same updated second image is output to the second display for viewing by the plurality of viewers and the outputting causes the second display to change from displaying a current image to displaying the updated second image.

18. The screen output control method according to claim 17, wherein acquiring a first image and extracting a differential region are repeated at predetermined intervals and the outputting to the second display comprises incorporating in chronological order a portion of the first image at different time points that corresponds to a differential region for which the designation to output has been accepted into the second image and outputs the updated second image at the different time points to the second display.

19. A computer program product for realizing an information processing apparatus having a plurality of display outputs, the computer program product comprising:
- a non-transitory storage medium readable by a processing circuit and storing instructions for execution by the processing circuit for performing causing a computer to function as:
- an image acquiring unit configured to acquire a first image for output to a first display;
- a differential region extracting unit configured to extract a differential region between the first image and a second image for output to a second display for viewing by a plurality of viewers;
- a designation accepting unit configured to accept a designation of whether a differential region is output to the second display for each differential region, the designation for each differential region based solely on content of the differential region; and
- an image output unit configured to incorporate a portion of the first image that corresponds to the differential region for which a designation of output has been accepted into the second image and to output the updated second image to the second display, wherein the same second updated image is output to the second display for viewing by the plurality of viewers.

20. The computer program product according to claim 19, wherein the image acquiring unit is configured to acquire the first image at a plurality of time points and the image output unit is configured to incorporate portions of the first image that correspond to differential regions for which a designation of output has been accepted into the second image in chronological order and to output the updated second image to the second display in sequence.

* * * * *